United States Patent
Kim et al.

(10) Patent No.: US 9,912,365 B2
(45) Date of Patent: Mar. 6, 2018

(54) WATCH TYPE TERMINAL AND METHOD FOR CONTROLLING THE SAME

(71) Applicant: LG ELECTRONICS INC., Seoul (KR)

(72) Inventors: Hyunkyung Kim, Seoul (KR); Kwanghee Cho, Seoul (KR); Youngtak Kim, Seoul (KR); Jeongho Lee, Seoul (KR); Inho Choi, Seoul (KE); Jiwon Yun, Seoul (KR); Jongkyeong Park, Seoul (KR); Hyeongu Kang, Seoul (KR); Nikolay Akatyev, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/519,136

(22) PCT Filed: Mar. 27, 2015

(86) PCT No.: PCT/KR2015/003077
§ 371 (c)(1),
(2) Date: Apr. 13, 2017

(87) PCT Pub. No.: WO2016/060342
PCT Pub. Date: Apr. 21, 2016

(65) Prior Publication Data
US 2017/0237459 A1    Aug. 17, 2017

(30) Foreign Application Priority Data

Oct. 16, 2014  (KR) .................. 10-2014-0140006
Jan. 9, 2015  (KR) .................. 10-2015-0003600

(51) Int. Cl.
*H04M 1/00* (2006.01)
*H04B 1/38* (2015.01)
(Continued)

(52) U.S. Cl.
CPC ............. *H04B 1/385* (2013.01); *G04B 47/00* (2013.01); *H04M 1/0266* (2013.01);
(Continued)

(58) Field of Classification Search
CPC ........ H04B 1/3833; H04B 1/40; H04B 17/23; H04B 2001/3861; H04M 1/7203;
(Continued)

(56) References Cited

U.S. PATENT DOCUMENTS 7,742,100 B2 * 6/2010 Yoo .................... H04M 1/0247
455/575.1
9,471,043 B2 * 10/2016 Joung .................... G04G 17/00
(Continued)

FOREIGN PATENT DOCUMENTS

KR         101395614         5/2014

OTHER PUBLICATIONS

PCT International Application No. PCT/KR2015/003077, International Search Report dated Jul. 20, 2015, 2 pages.

*Primary Examiner* — Quochien B Vuong
(74) *Attorney, Agent, or Firm* — Lee, Hong, Degerman, Kang & Waimey

(57) ABSTRACT

The present disclosure relates to a watch type mobile terminal which includes a main body, an infrared communication unit configured to generate an infrared signal, a communication unit configured to perform communication in a wireless manner, a sensing unit configured to sense an attachment of the main body to a first device, the first device configured to receive the infrared signal, and a controller configured to control the infrared communication unit to generate an infrared signal for the first device on the basis of a control signal associated with the first device, received from a second device through the communication unit, when the attachment of the main body to the first device is sensed, (Continued)

and configured to transmit the generated infrared signal to the first device through the infrared communication unit.

20 Claims, 18 Drawing Sheets

(51) Int. Cl.
*H04B 1/3827* (2015.01)
*H04M 1/725* (2006.01)
*H04M 1/02* (2006.01)
*G04B 47/00* (2006.01)

(52) U.S. Cl.
CPC . *H04M 1/72575* (2013.01); *H04B 2001/3861* (2013.01); *H04M 2201/38* (2013.01)

(58) Field of Classification Search
CPC . H04M 2001/38; H04W 4/008; H04W 88/02; H04L 2012/2841; H04L 2209/80; H04N 5/2252; H04N 21/4223
USPC .............. 455/90.3, 556.1, 557, 566, 575.1
See application file for complete search history.

(56) References Cited

U.S. PATENT DOCUMENTS

| | | | |
|---|---|---|---|
| 9,473,697 B2* | 10/2016 | Jeung | H04N 5/23222 |
| 9,568,891 B2* | 2/2017 | Adams | G04G 21/08 |
| 2011/0288379 A1 | 11/2011 | Wu | |
| 2014/0239065 A1 | 8/2014 | Zhou et al. | |
| 2015/0253886 A1* | 9/2015 | Wei | G06F 3/041 |
| | | | 345/173 |
| 2016/0085266 A1* | 3/2016 | Lee | H04N 5/2628 |
| | | | 348/240.2 |
| 2016/0124497 A1* | 5/2016 | Lee | G06K 9/00228 |
| | | | 345/173 |
| 2016/0134737 A1* | 5/2016 | Pulletikurty | G06F 3/0227 |
| | | | 715/735 |

* cited by examiner

[Fig. 1a]
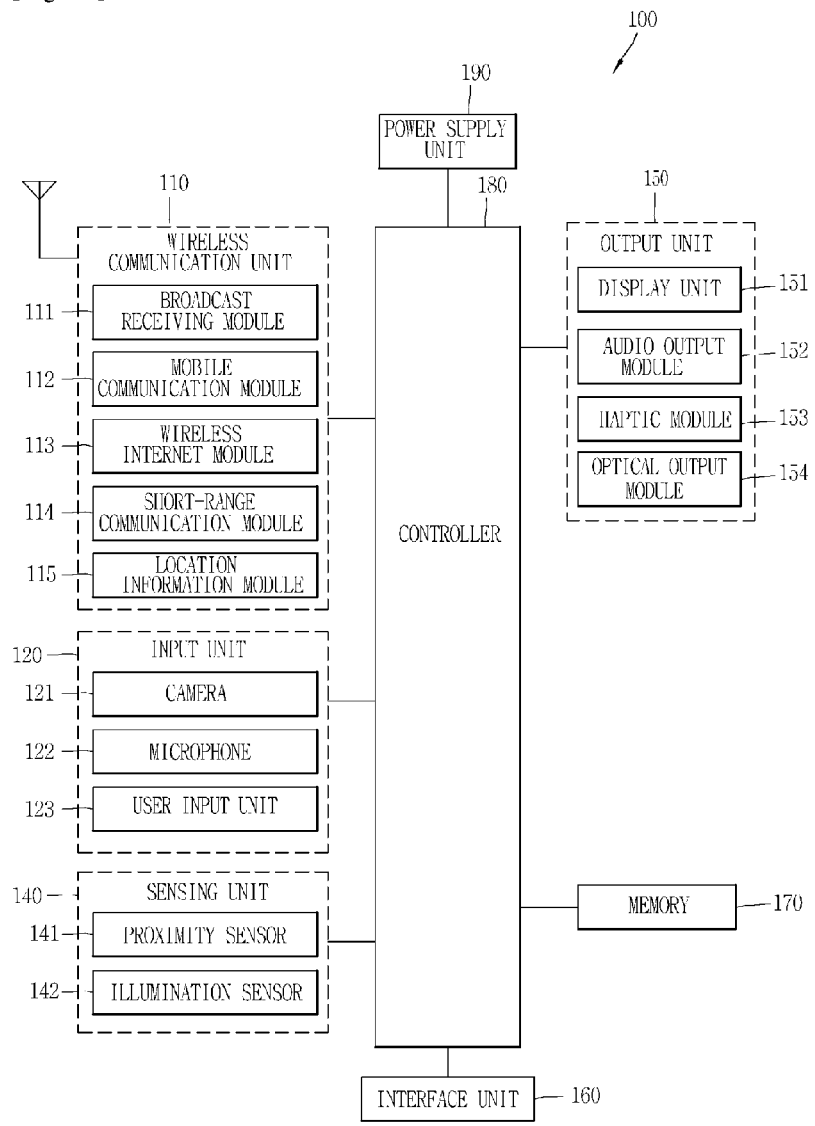
[Fig. 1b]
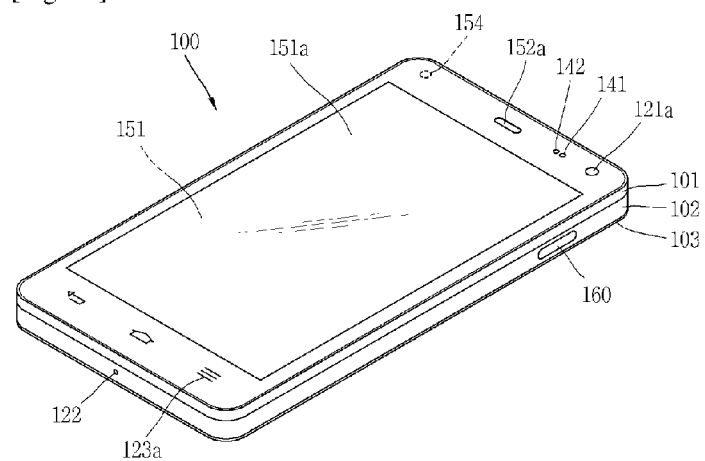

[Fig. 1c]
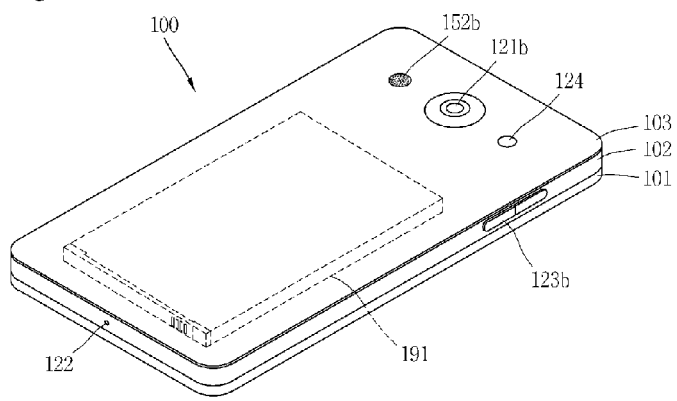
[Fig. 2a]
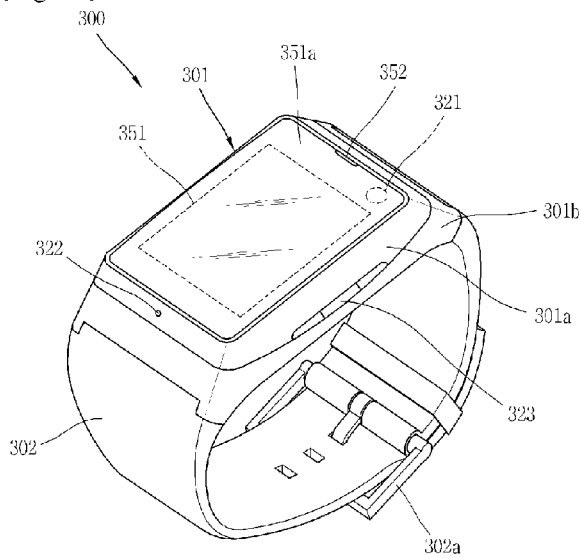
[Fig. 2b]
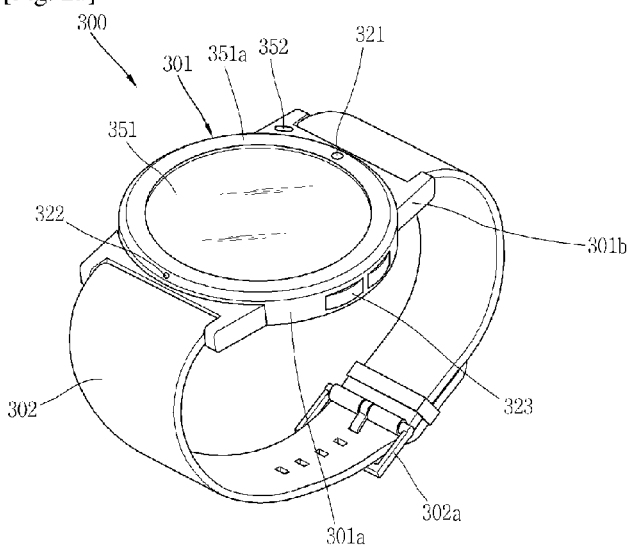

[Fig. 3]
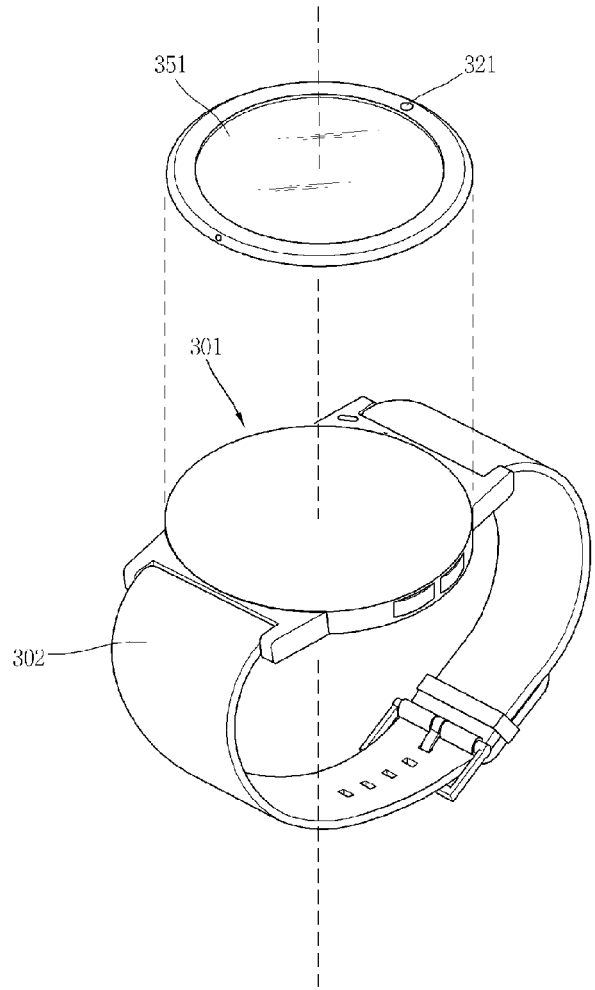
[Fig. 4]
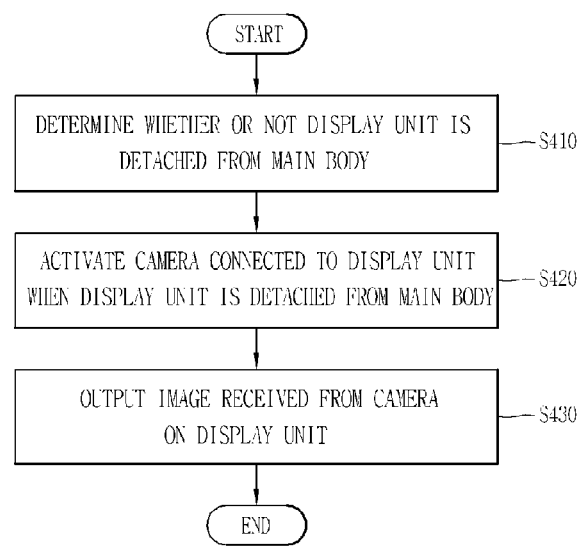

[Fig. 5a]
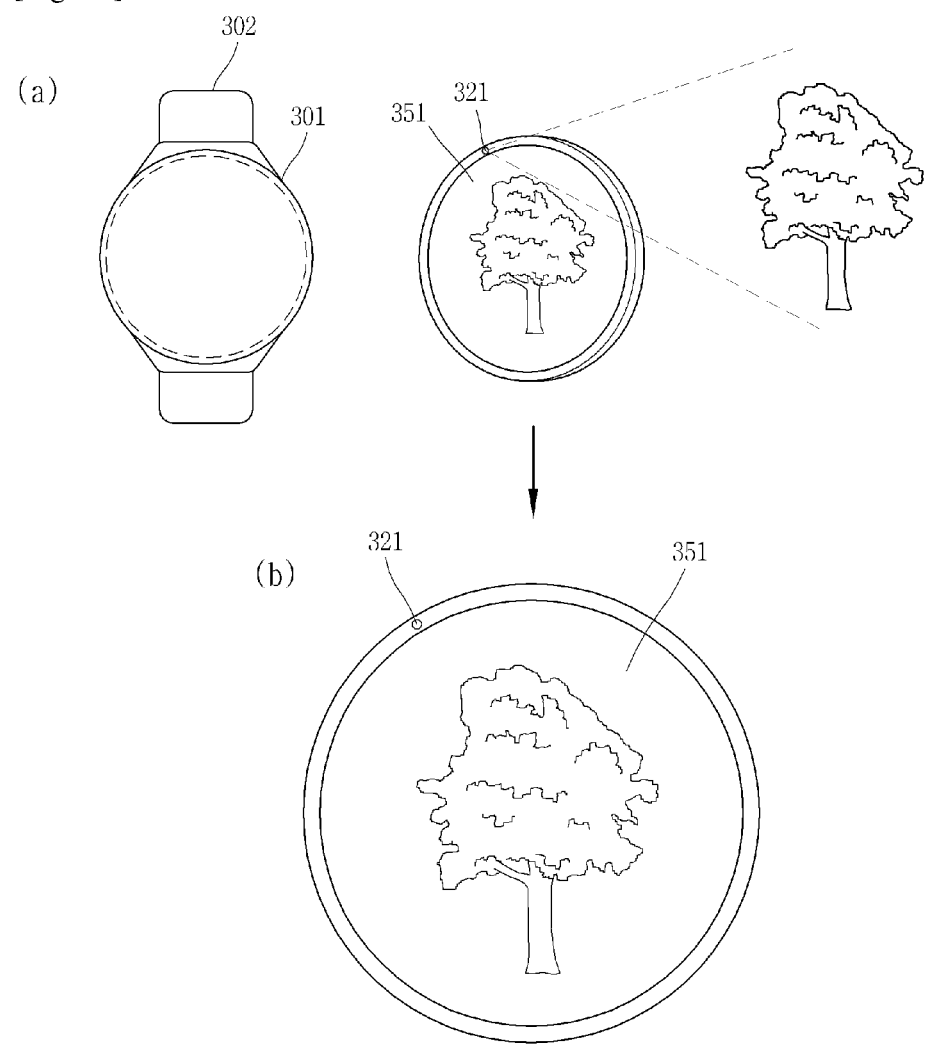

[Fig. 5b]
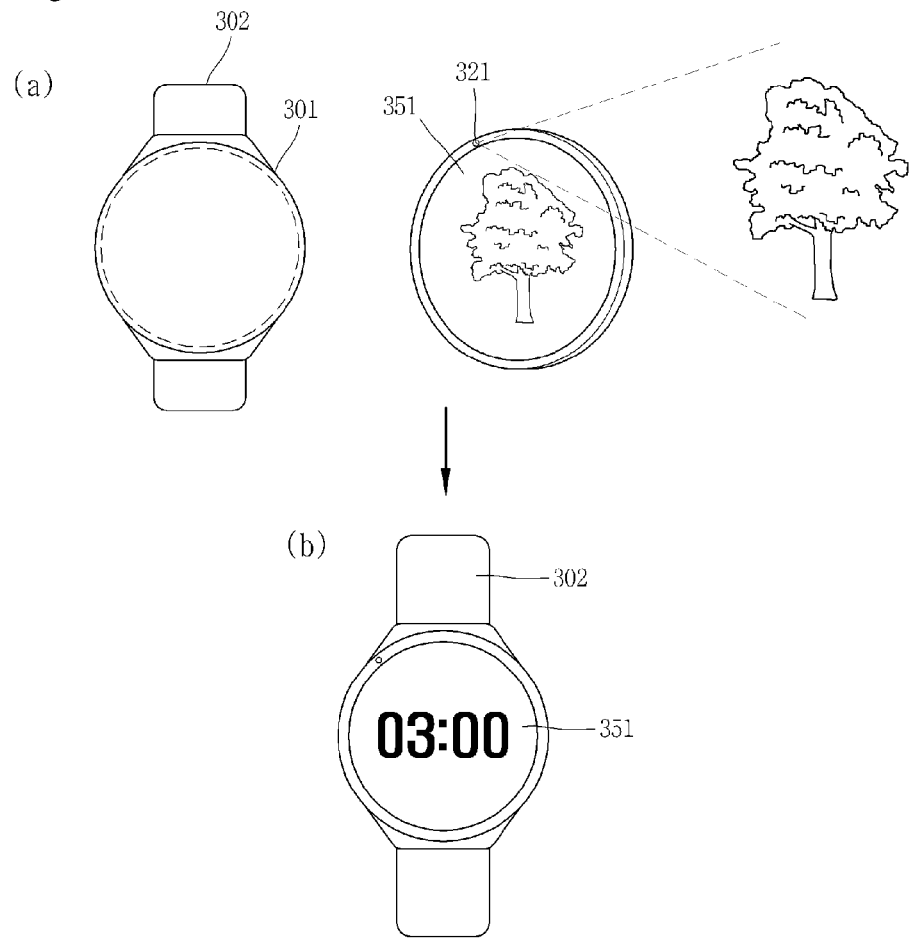
[Fig. 5c]
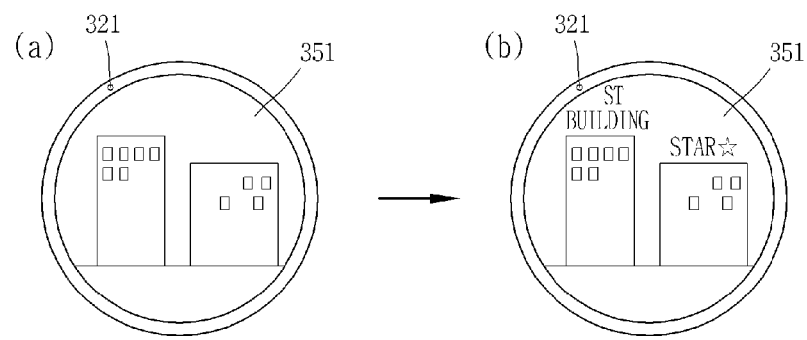

[Fig. 6a]
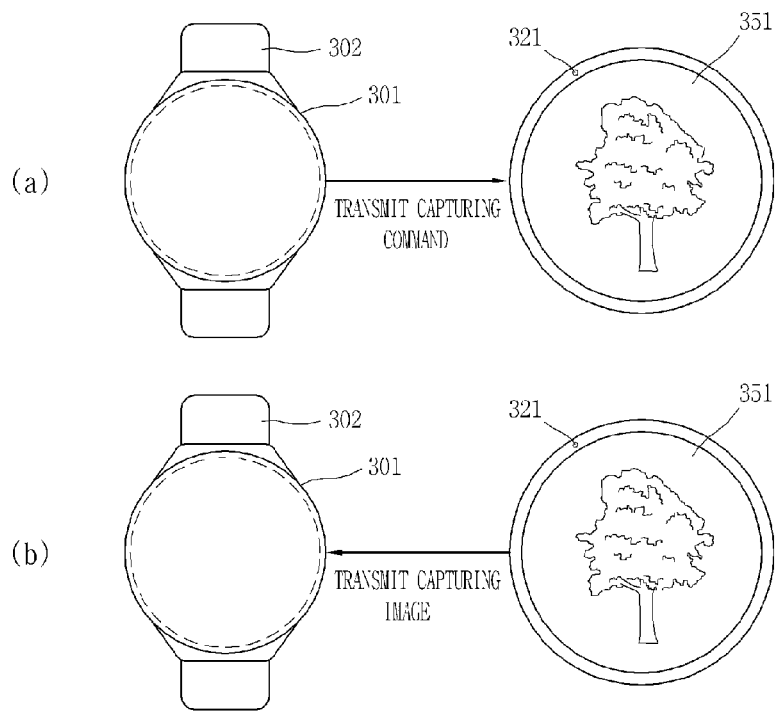
[Fig. 6b]
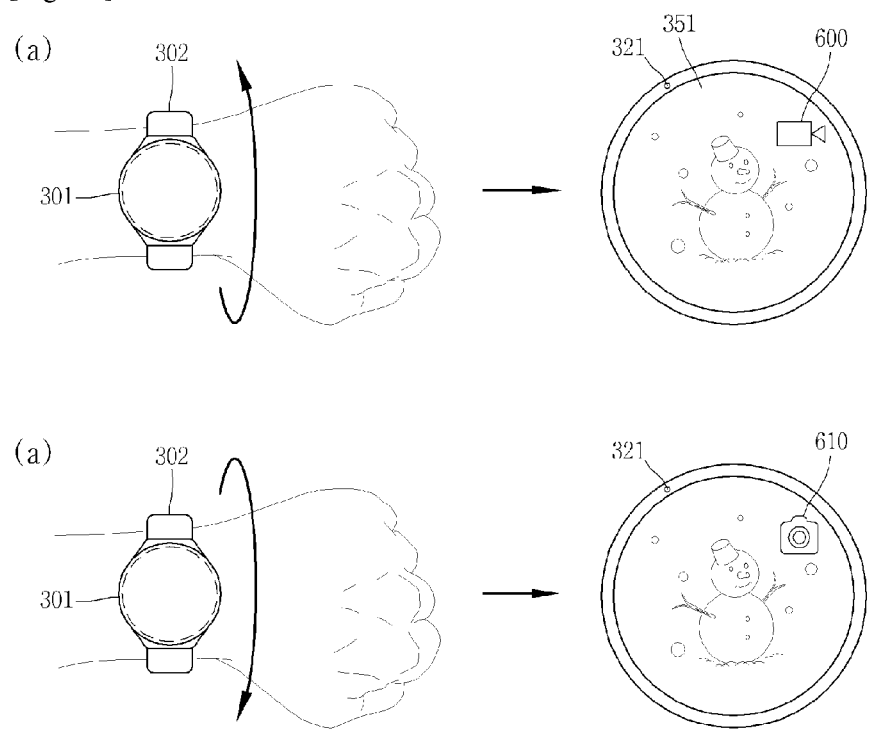

[Fig. 7]
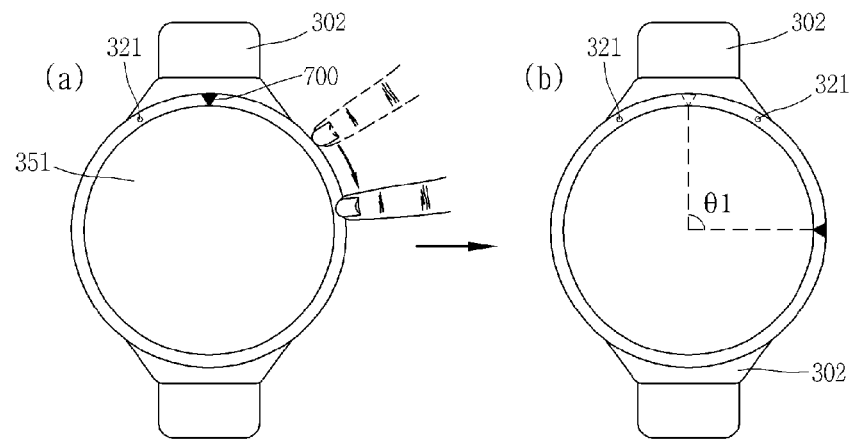
[Fig. 8a]
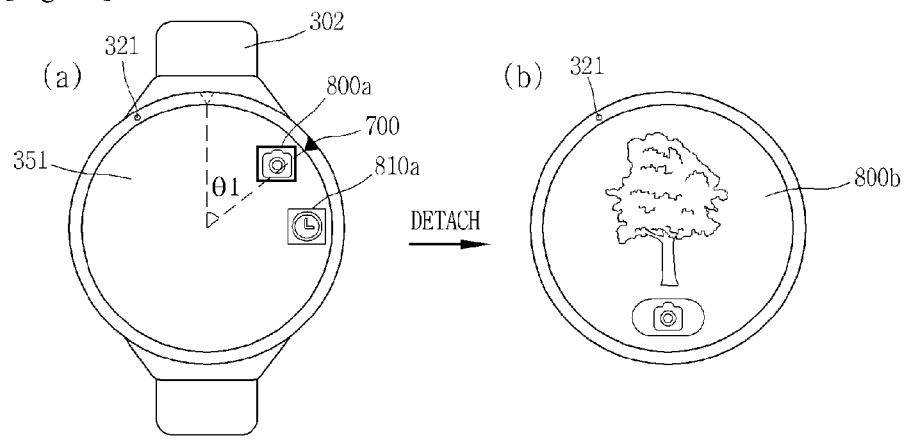
[Fig. 8b]
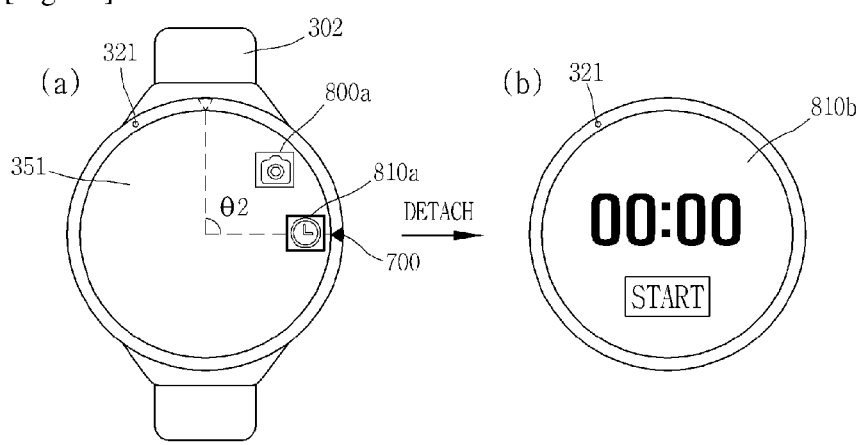

[Fig. 9a]
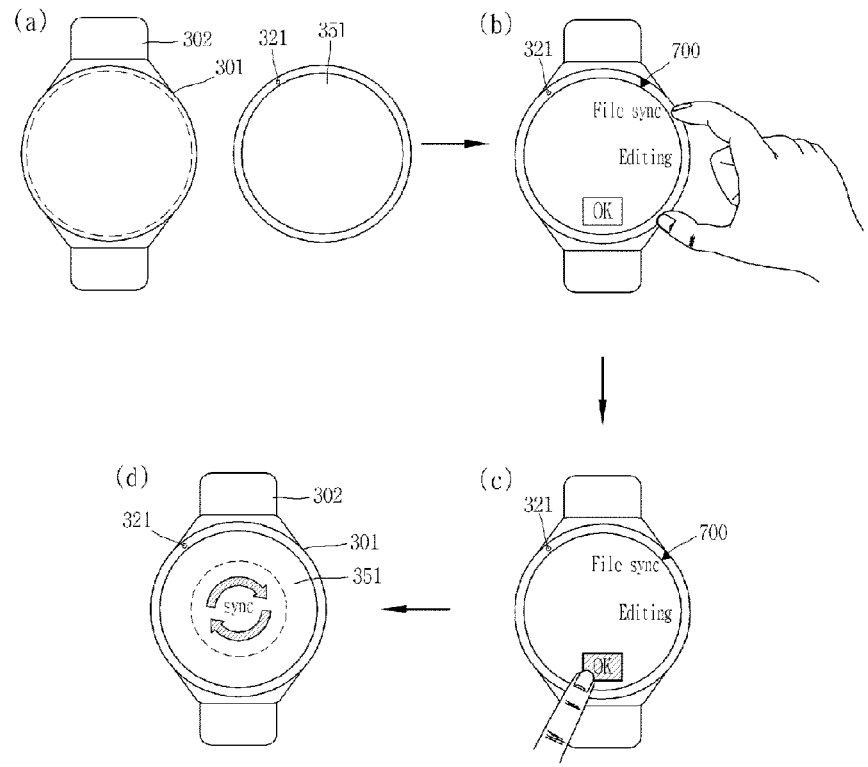
[Fig. 9b]
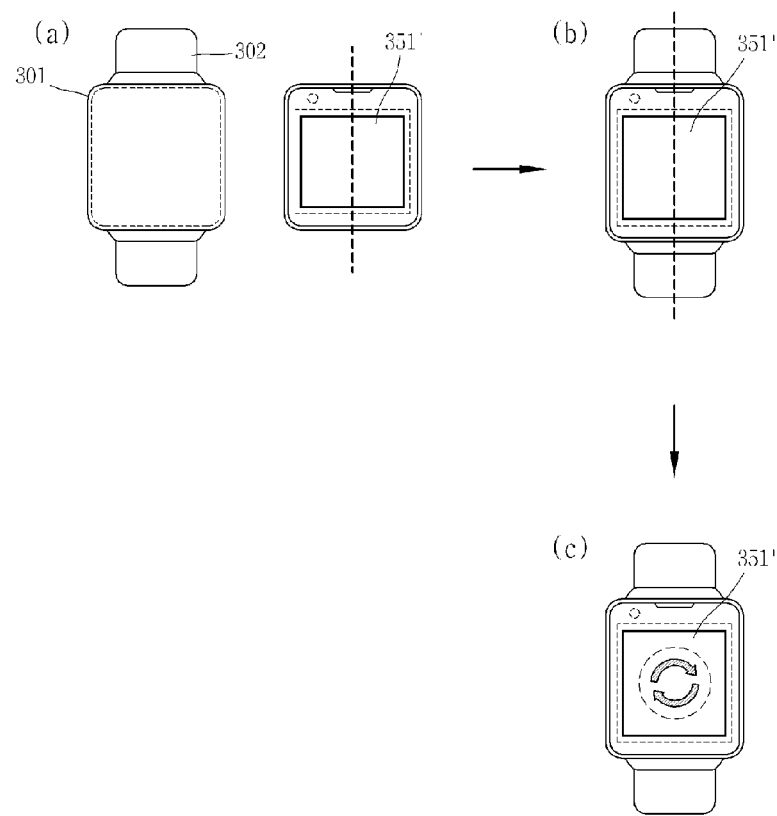

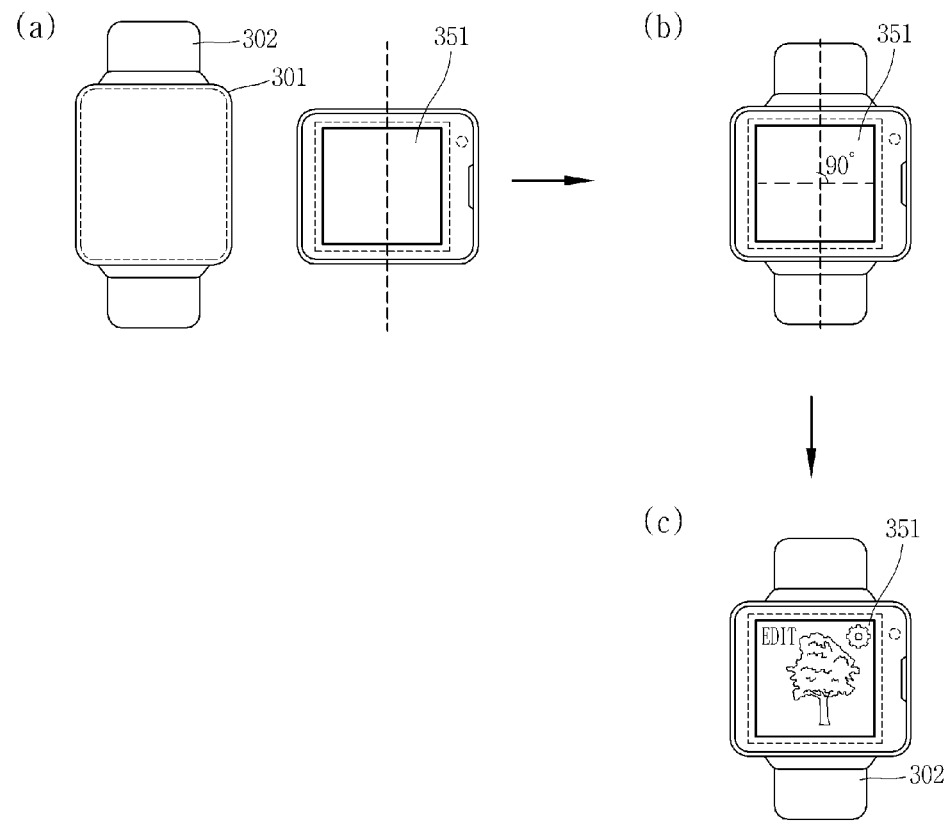
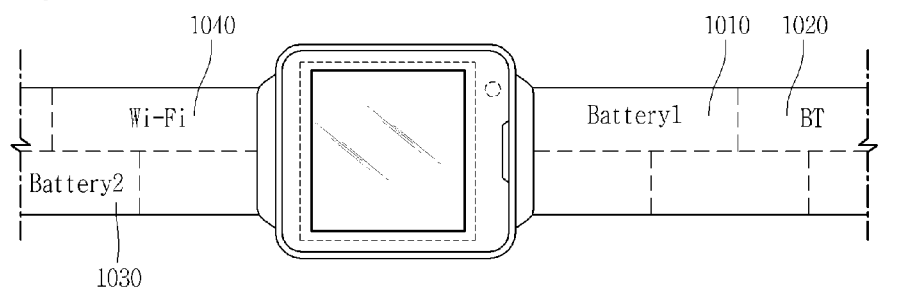

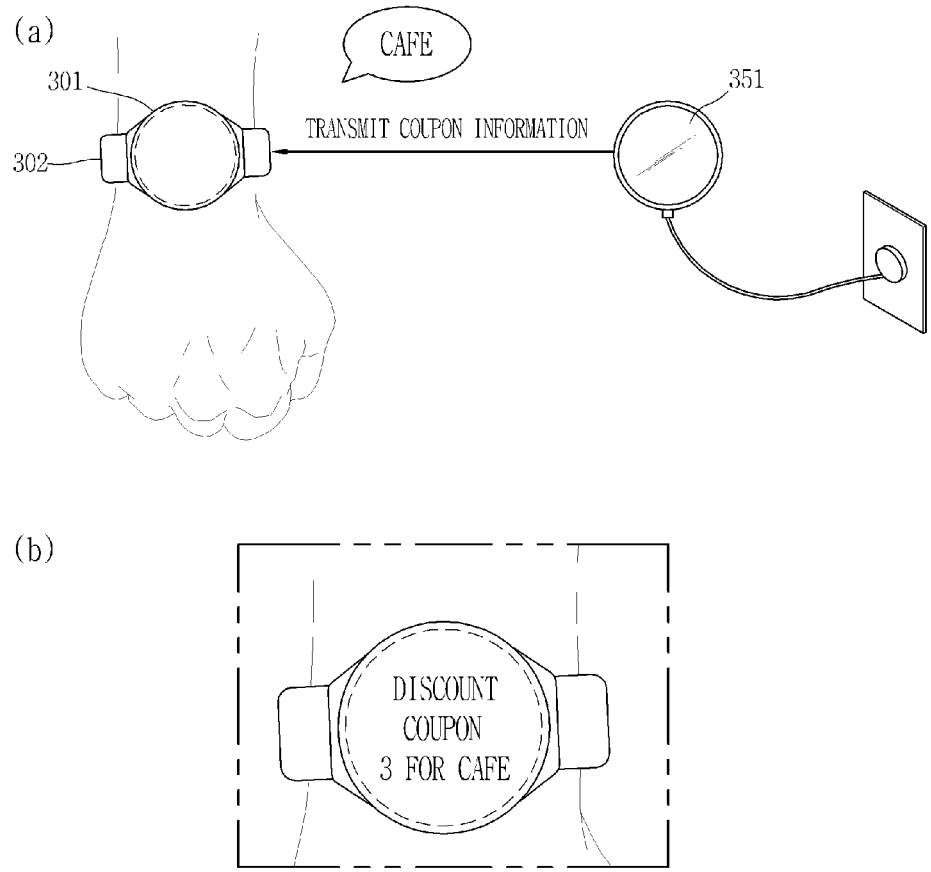

[Fig. 12a]
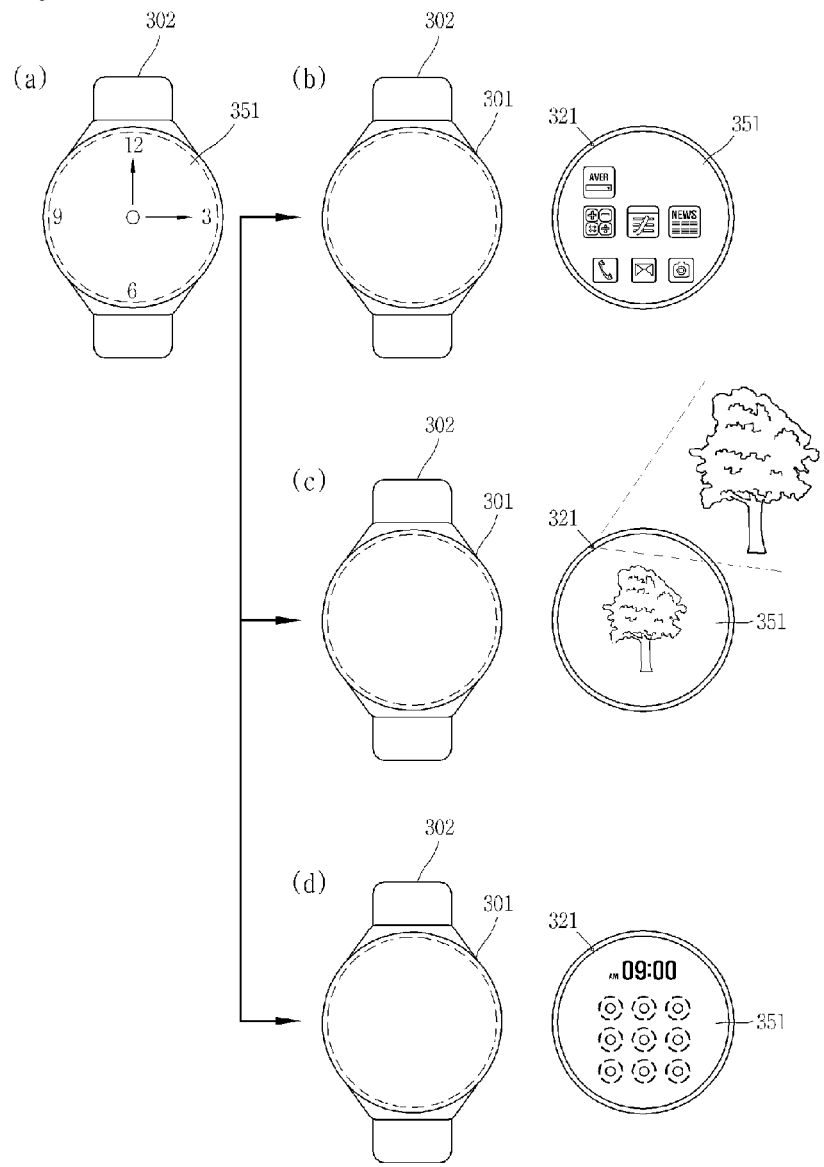
[Fig. 12b]
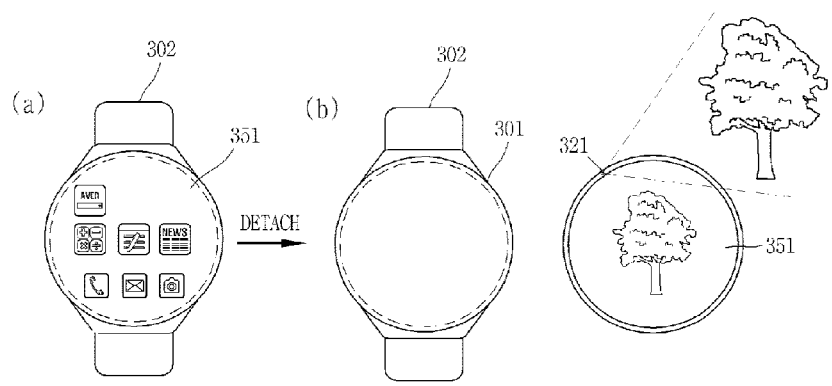

[Fig. 13]
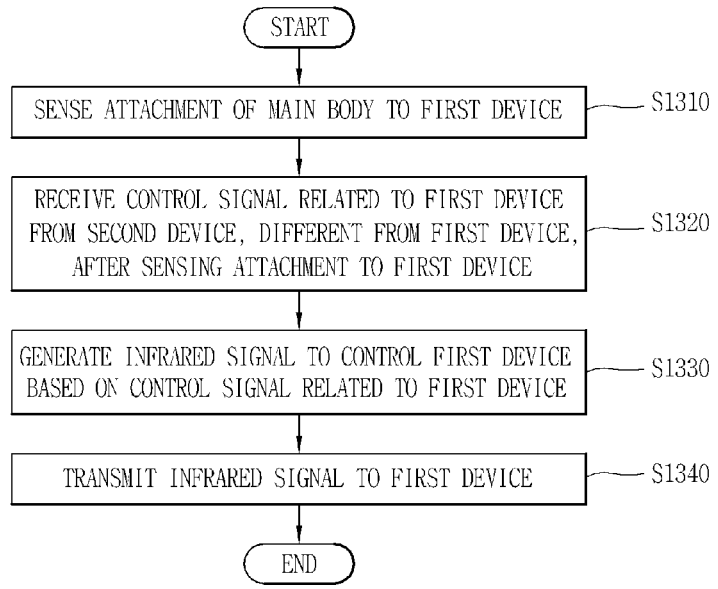
[Fig. 14a]
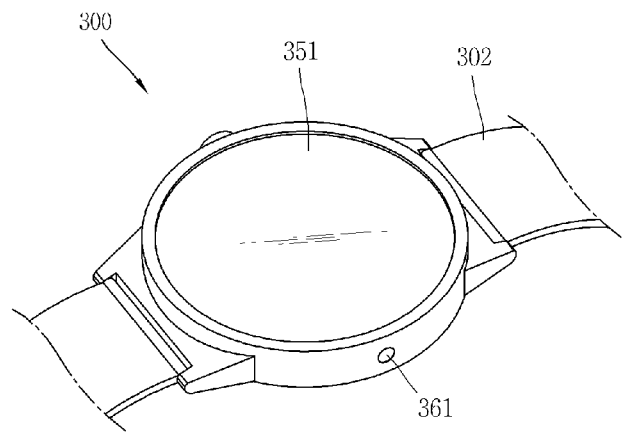
[Fig. 14b]
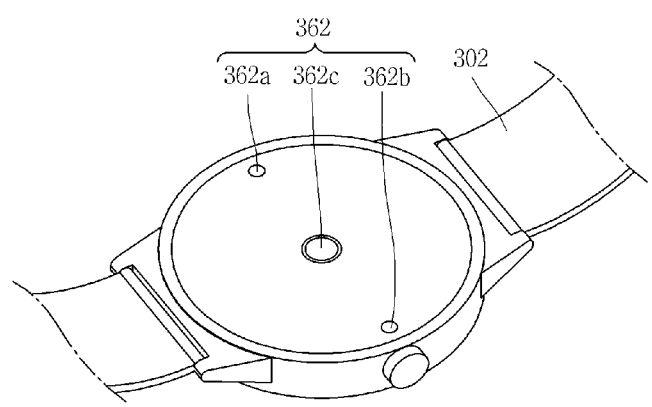

[Fig. 15]
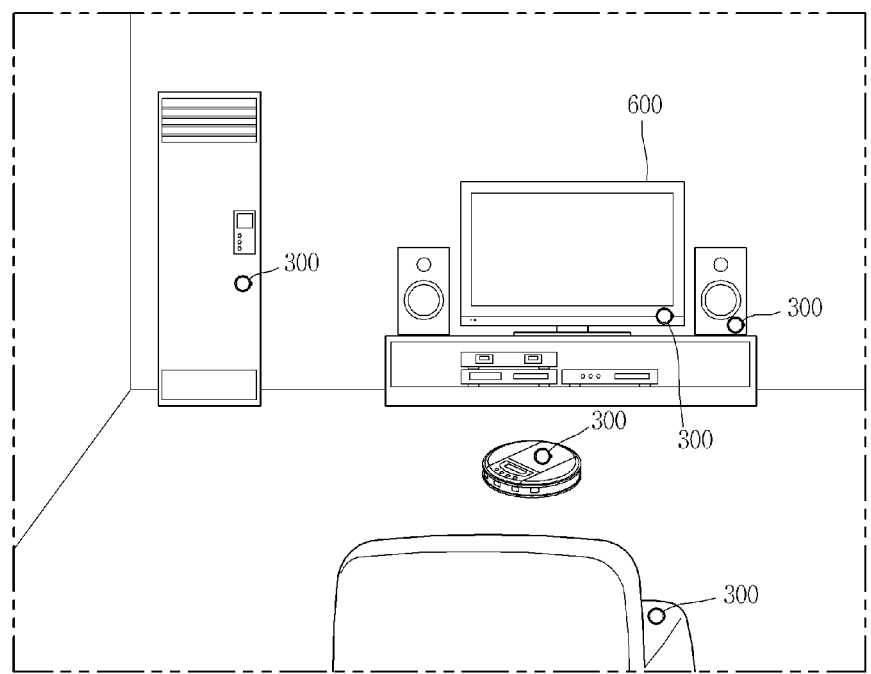
[Fig. 16]
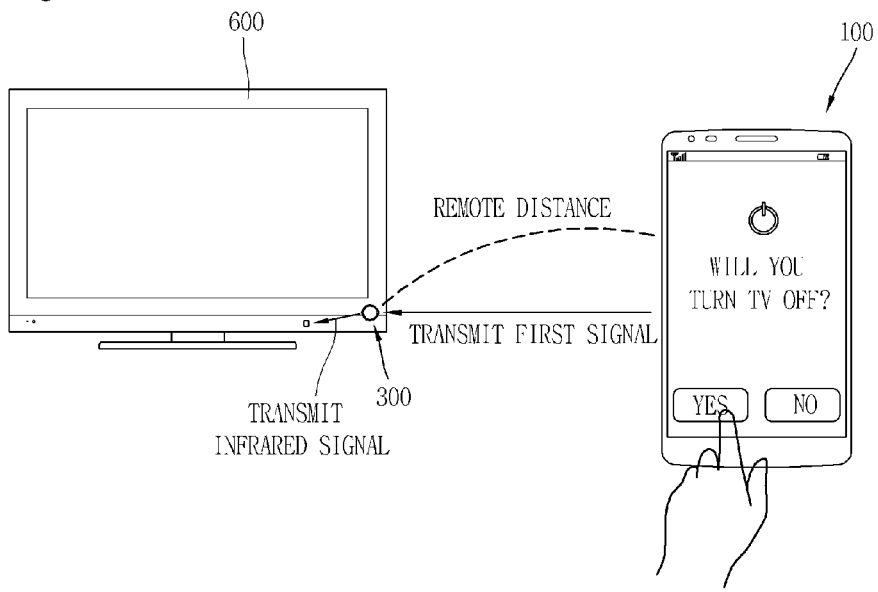

[Fig. 17a]
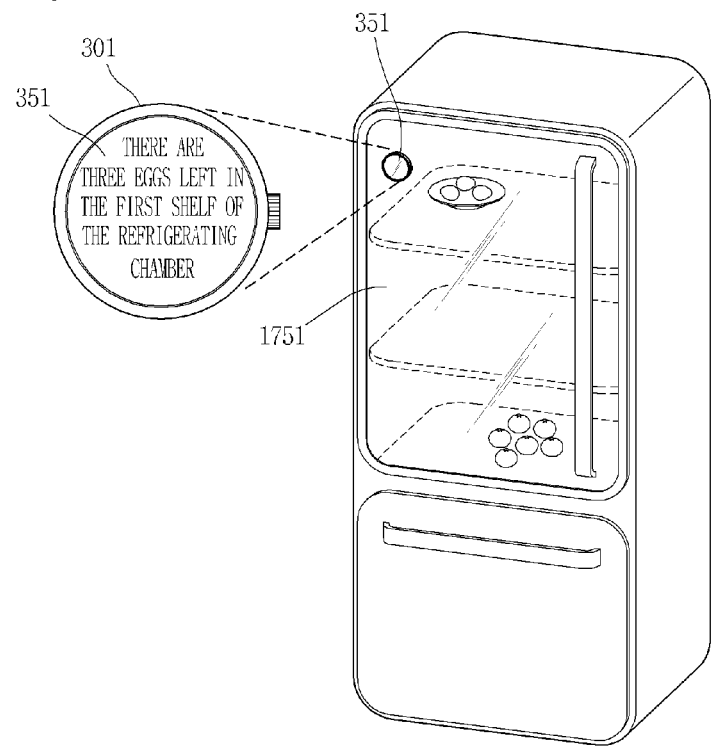
[Fig. 17b]
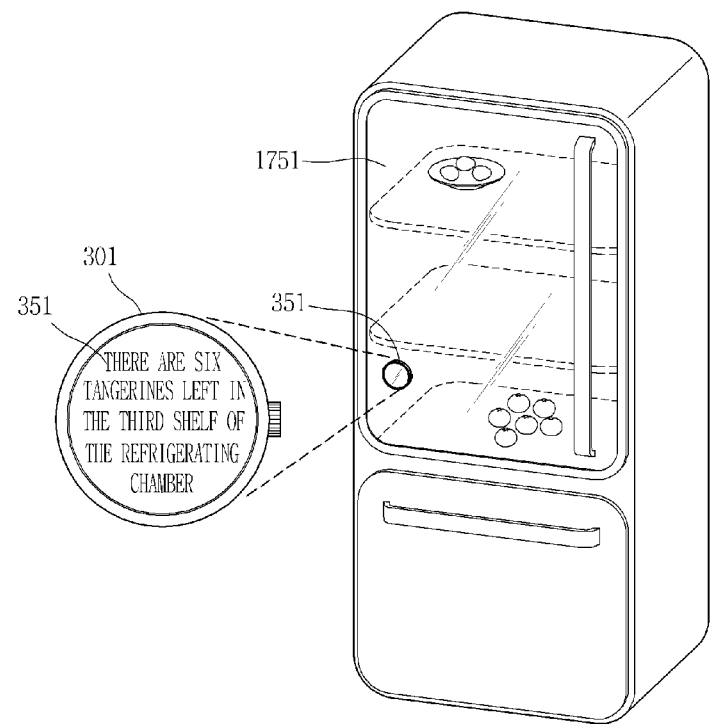

[Fig. 18]
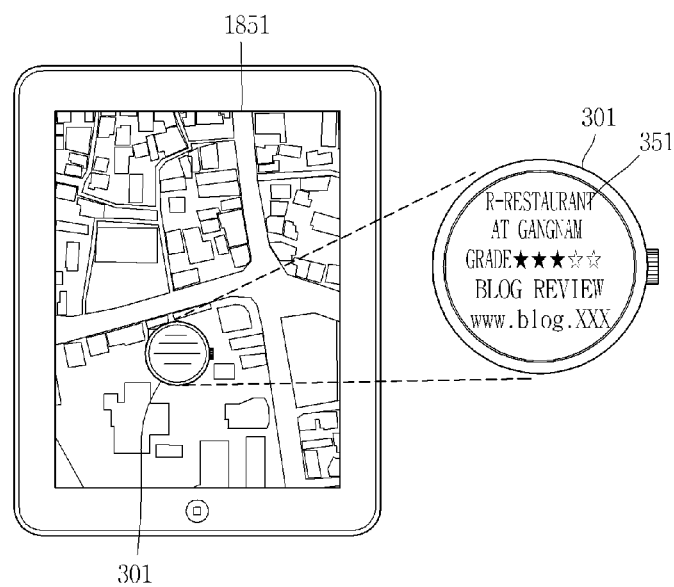
[Fig. 19]
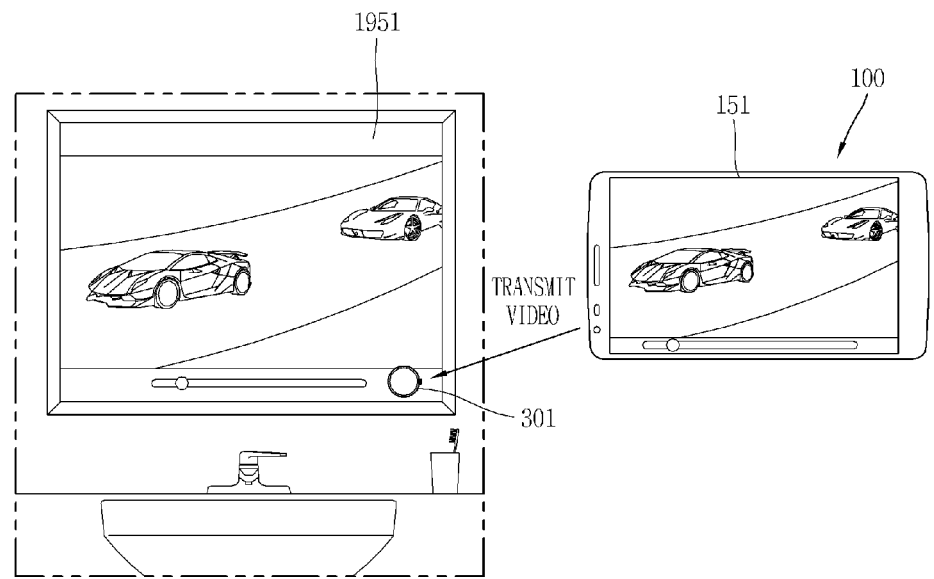

[Fig. 20a]
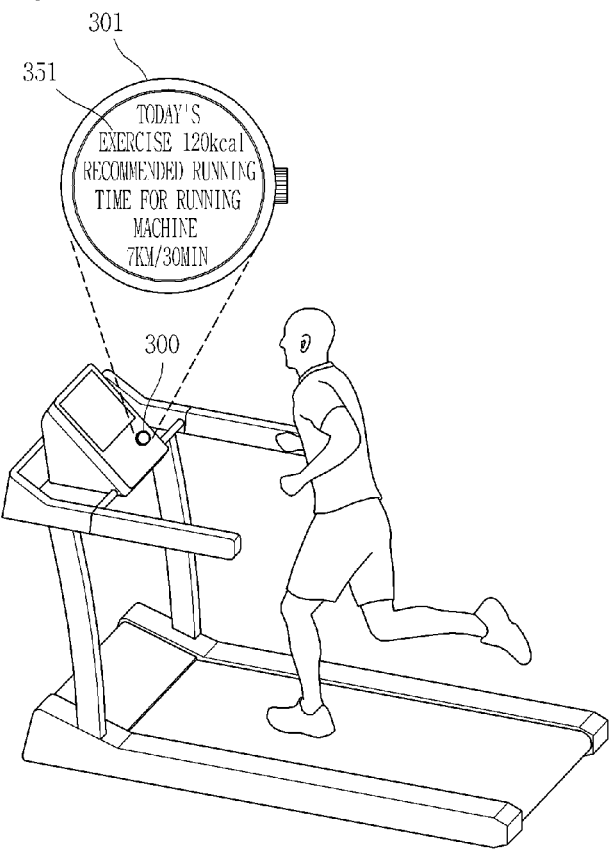
[Fig. 20b]
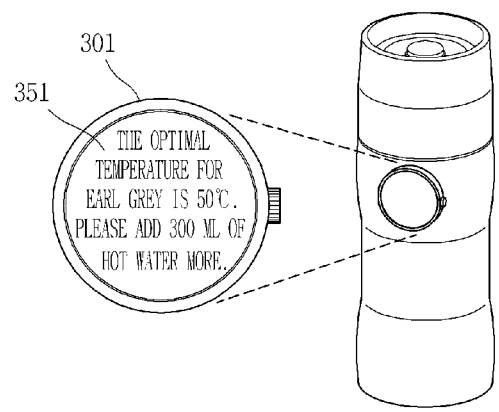

[Fig. 21a]
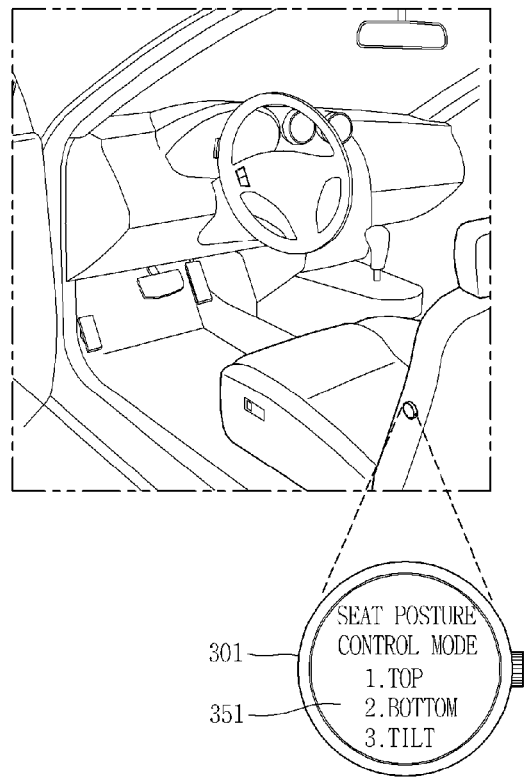
[Fig. 21b]
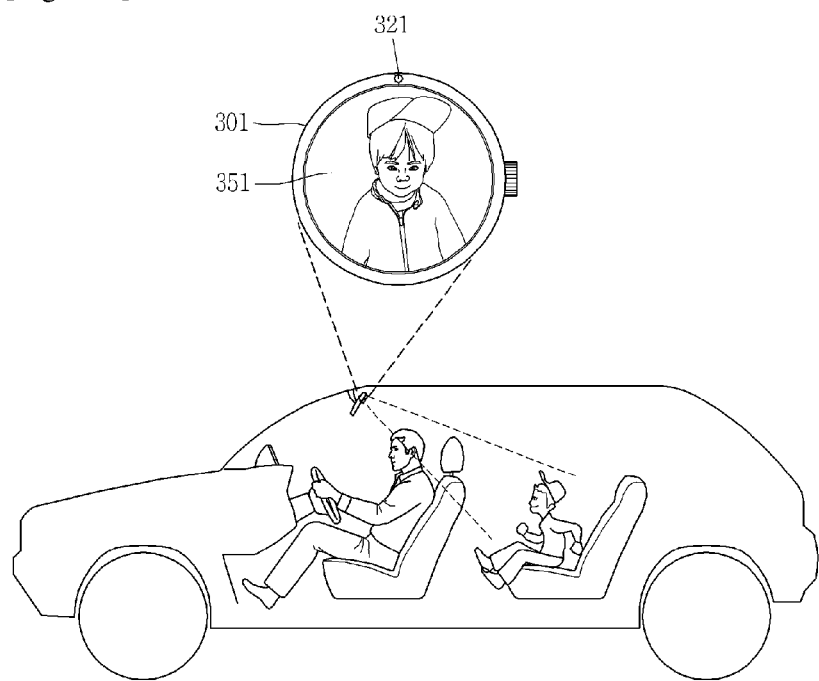

[Fig. 21c]
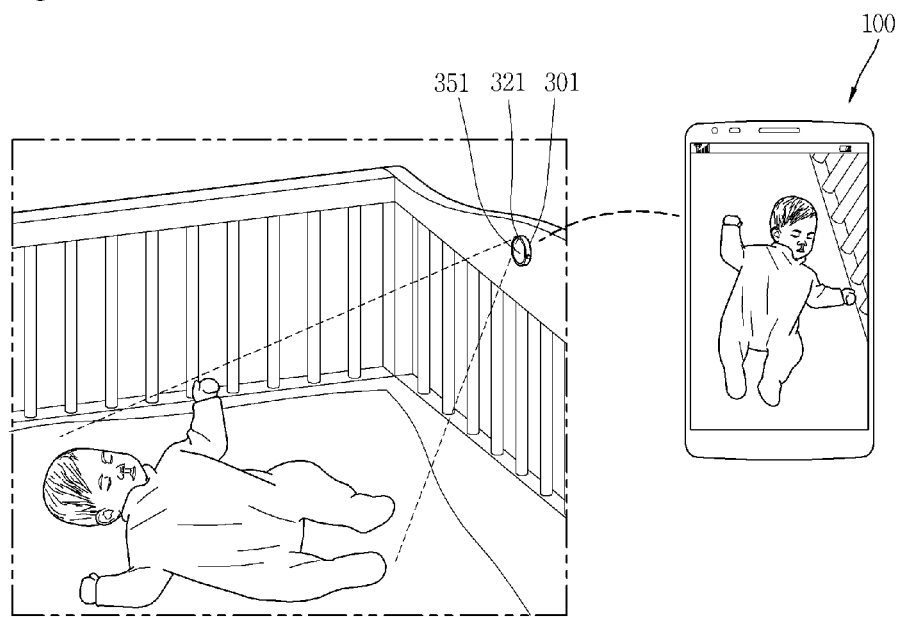
[Fig. 21d]
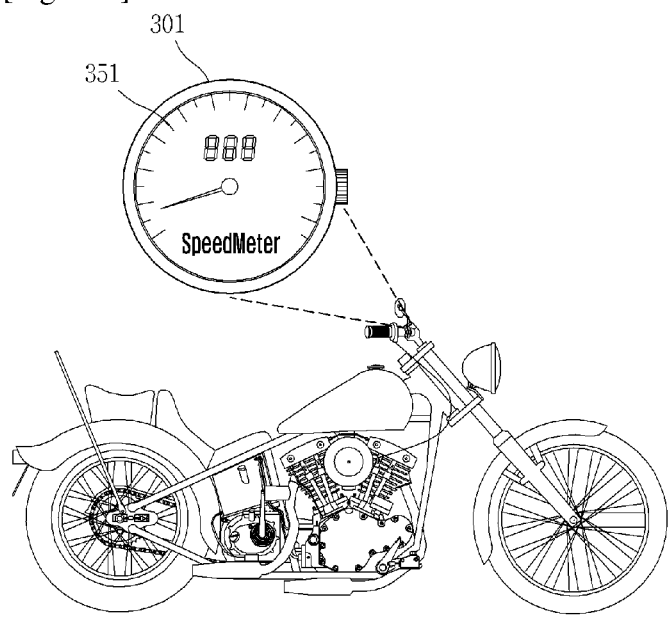

WATCH TYPE TERMINAL AND METHOD FOR CONTROLLING THE SAME

CROSS-REFERENCE TO RELATED APPLICATIONS

This application is the National Stage filing under 35 U.S.C. 371 of International Application No. PCT/KR2015/003077, filed on Mar. 27, 2015, which claims the benefit of earlier filing date and right of priority to Korean Application Nos. 10-2014-0140006, filed on Oct. 16, 2014, and 10-2015-0003600, filed on Jan. 9, 2015, the contents of which are all hereby incorporated by reference herein in their entirety.

TECHNICAL FIELD

The present disclosure relates to a watch type terminal capable of detaching each component, and a method for controlling the same.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements.

The mobile terminal has recently been developed into a type to be wearable on a human body. For example, a mobile terminal which is wearable on a wrist is introduced. Meanwhile, necessity to develop UI/UX which takes into account features of the mobile terminal which is wearable on the wrist is on the rise.

DISCLOSURE OF INVENTION

Technical Problem

Therefore, to obviate those problems, an aspect of the detailed description is to provide a method for capturing an image by detaching a display unit in a watch type mobile terminal.

Another aspect of the detailed description is to provide a method for performing various functions in a manner of separating each component in a watch type mobile terminal.

Another aspect of the detailed description is to provide a method for controlling an external device using a detached (separated) watch type terminal.

Solution to Problem

To achieve these and other advantages and in accordance with the purpose of the present invention, as embodied and broadly described herein, there is provided a watch type terminal including a camera, a display unit connected to the camera, a main body to which the display unit is attachable, and a controller that is configured to activate the camera based on whether or not the display unit is attached to the main body, wherein the controller may output an image received from the camera on the display unit.

In one exemplary embodiment disclosed herein, the controller may activate the camera when the display unit is detached from the main body.

In one exemplary embodiment disclosed herein, the controller may sense a rotated angle of the display unit with respect to the main body in a clockwise or counterclockwise direction. The controller may then activate the camera to capture one of a video and a still image on the basis of the rotated angle.

In one exemplary embodiment disclosed herein, the watch type terminal may further include a first communication unit connected to the display unit, and a second communication unit connected to the main body and configured to perform communication with the first communication unit. The controller may transmit a capturing command to the camera through the first and second communication units when the display unit is detached from the main body. When an image is captured by the camera, the controller may transmit the captured image to the main body.

In one exemplary embodiment disclosed herein, the watch type terminal may further include a sensing unit configured to sense a movement of the main body, and the controller may generate a different control command according to the movement of the main body.

In one exemplary embodiment disclosed herein, the main body may include a front surface, and the watch type terminal may further include another display unit disposed on the front surface of the main body. The controller may output a second screen associated with a first screen on the another display unit of the main body when the first screen is output on the display unit while the display unit is detached from the main body.

In one exemplary embodiment disclosed herein, the watch type terminal may further include a wireless communication unit configured to receive a call signal from an external terminal. The controller may execute a call function for performing a call with the external terminal when the display unit is detached while the call signal is received from the external terminal. In one exemplary embodiment disclosed herein, the watch type terminal may further include a distance sensing unit connected to the display unit and configured to sense a relative distance between the display unit and user's eyes. The controller may enlarge or reduce screen information output on the display unit on the basis of the relative distance.

In one exemplary embodiment disclosed herein, the controller may deactivate the activated camera when it is sensed that the display unit is attached to the main body.

In accordance with another exemplary embodiment of the present invention, a watch type terminal may include a main body, an infrared communication unit configured to generate an infrared signal, a communication unit configured to perform communication in a wireless manner, a sensing unit configured to sense an attachment of the main body to a first device, the first device configured to receive the infrared signal, and a controller configured to control the infrared communication unit to generate an infrared signal for the first device on the basis of a control signal associated with the first device, received from a second device through the communication unit, when the attachment of the main body to the first device is sensed, and configured to transmit the generated infrared signal to the first device through the infrared communication unit.

In one exemplary embodiment disclosed herein, the controller may detect a type of the first device through the sensing unit, and transmit information indicating the type of the first device to the second device.

In one exemplary embodiment disclosed herein, the controller may receive a control signal from the second device. Here, the control signal may be generated based on the information indicating the type of the first device. The controller may then generate an infrared signal for turning on or off the first device on the basis of the control signal.

In one exemplary embodiment disclosed herein, the watch type terminal may further include a band configured to be detachable from the main body and be worn on a wrist. The controller may enter an external control mode for performing a function of controlling an external device when the detachment of the main body from the band is sensed. The external control mode may be a mode for transmitting the infrared signal to the first device on the basis of the control signal received from the second device.

In one exemplary embodiment disclosed herein, the controller may terminate the external control mode when the attachment of the main body to the band is sensed.

In one exemplary embodiment disclosed herein, the controller may receive status information on the first device from the first device when the first device is able to perform wireless communication with the watch type terminal.

In one exemplary embodiment disclosed herein, the sensing unit may sense a region where the main body is attached to the first device. The controller may receive status information associated with the attached region, on the basis of the attached region of the first device.

In one exemplary embodiment disclosed herein, the watch type terminal may further include a display unit configured to output screen information. The status information associated with the attached region may be output on the display unit.

In one exemplary embodiment disclosed herein, the first device may be a device allowed to perform wireless communication. The controller may transmit a control command to the first device such that screen information indicating a function currently executed in the watch type terminal is output on the first device.

In one exemplary embodiment disclosed herein, the watch type terminal may further include a status sensing unit configured to sense status information related to the watch type terminal, and a display unit connected to the main body. The controller may detect a type of he first device when the main body is attached to the first device, and output information indicating the type of the first device, on the display unit. Here, the information may be included in the status information related to the watch type terminal.

In one exemplary embodiment disclosed herein, the controller may control the information indicating the type of the first device to disappear from the display unit when the main body is detached from the first device.

Advantageous Effects of Invention

The present invention can provide various functions associated with an external device by attaching the main body to the external device. Accordingly, the present invention may easily provide various functions through the functions of the watch type terminal, without a separate installation in the external device.

BRIEF DESCRIPTION OF DRAWINGS

FIG. 1A is a block diagram of a mobile terminal in accordance with the present disclosure.

FIGS. 1B and 1C are conceptual views illustrating one example of the mobile terminal, viewed from different directions.

FIGS. 2A, 2B and 3 are perspective views of a watch type mobile terminal according to another exemplary embodiment of the present disclosure.

FIG. 4 is a flowchart illustrating a method for controlling a watch type terminal in accordance with one exemplary embodiment disclosed herein.

FIGS. 5A to 5C are conceptual views illustrating the control method of FIG. 4.

FIGS. 6A and 6B are conceptual views illustrating a method of capturing an image when a display unit and a main body are separated from each other.

FIG. 7 is a conceptual view illustrating that a display unit provided at a watch type mobile terminal rotates.

FIGS. 8A and 8B are conceptual views illustrating that a different function is executed according to a rotated degree of a display unit provided at a watch type mobile terminal.

FIGS. 9A to 9C are conceptual views illustrating that a different function is executed according to a coupled (or attached) angle when a detached display unit is attached.

FIG. 10 is a conceptual view illustrating a band to which components can be assembled (attached) in a watch type mobile terminal.

FIG. 11 is a conceptual view illustrating a control method through a band in a state that a display unit is charged after being detached.

FIGS. 12A and 12B are conceptual views related to releasing a lock state of a watch type mobile terminal.

FIG. 13 is a flowchart illustrating a method for controlling a watch type terminal in accordance with the present invention.

FIGS. 14A and 14B are conceptual views illustrating types of sensors provided in a watch type terminal in accordance with the present invention.

FIG. 15 is a conceptual view illustrating types of external devices to which a watch type terminal according to the present invention is attachable.

FIG. 16 is a conceptual view illustrating the control method of FIG. 13.

FIGS. 17A, 17B and 18 are conceptual views illustrating a method for controlling a watch type terminal in an attached state when the watch type terminal is attached onto a first device.

FIG. 19 is a conceptual view illustrating a method of performing a control according to status information related to a watch type terminal when the watch type terminal is attached onto an external device.

FIGS. 20A and 20B are conceptual views illustrating a method of providing different information according to a type of an external device to which the watch type terminal is attached.

FIGS. 21A to 21D are conceptual views illustrating a method of performing a different function according to a type of an external device to which a main body of the watch type terminal is attached.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several features, numbers, steps, operations, components, or combination thereof, disclosed in the specification, and it is also understood that greater or fewer features, numbers, steps, operations, components, or combination thereof may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It may be understood that implementing all of the illustrated components is not a requirement, and that greater or fewer components may alternatively be implemented.

In more detail, the wireless communication unit 110 among those components may include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, and a user input unit 123 (for example, a touch key, a push (or mechanical) key, and the like) for allowing a user to input information. Data (for example, audio, video, image, and the like) is obtained by the input unit 120 and may be analyzed and processed according to user commands.

The sensing unit 140 may be implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 may be configured to output various types of information, such as audio, video, tactile output, and the like. The output unit 150 may be shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A to execute an application program that have been stored in the memory 170. Also, the controller 180 may operate at least two components included in the mobile terminal in a combining manner to activate the application program.

The power supply unit 190 can be configured to receive external power or provide internal power, under the control of the controller, in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. Two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner. The location information module 115 is a module used for acquiring a location (or a current location) of the mobile terminal, and may not be limited to a module which directly calculates or acquires the location of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element or a mechanical key (for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

As aforementioned, the controller 180 controls the operations associated with the application programs and typically controls the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance. The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal may extend to a wearable device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

FIGS. 2A, 2B and 3 are perspective views of a watch type terminal according to another exemplary embodiment of the present disclosure.

As illustrated in FIG. 2A, a watch type mobile terminal 300 includes a main body 301 with a display unit 351, and a band 302 connected to the main body 301 to be wearable on a wrist. In general, mobile terminal 300 may be configured to include features that are the same or similar to that of mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351a is positioned on the first case 301a to form a front surface of the terminal body together with the first case 301a.

Meanwhile, the appearance of the display unit 351 of the watch type mobile terminal may be implemented into various shapes. For example, as illustrated in FIG. 2A, the display unit 351 may be formed in a rectangular shape. As another example, as illustrated in FIG. 2B, the display unit 351 may be formed in a circular shape. The appearance of the display unit 341 may be implemented into various shapes according to necessity, in addition to the rectangular and circular shapes.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

The watch type mobile terminal 300 may be configured such that the main body 301, the band 302 and the display unit 351 are detachable (separated) from one another. That is, the main body 301, the band 302 and the display unit 351 each may be configured as a module, so as to be detachable by an external force. For example, as illustrated in FIG. 3, the display unit 351 may be detached from the main body 301. This may allow the user to freely detach or attach the main body 301, the band 302 and the display unit 351 for use, if necessary.

In the watch type mobile terminal 300 with the main body 301 and the display unit 351 detachable from each other, when the display unit 351 is detached from the main body 301, the controller 180 provided in the main body 301 may control the display unit 351 through communication.

Also, the display unit 351 may be provided with a controller, separate from the controller 180 provided in the main body 301. In this instance, the controller of the display unit 351 may be activated to control the display unit 351 when the display unit 351 is detached from the main body 301. The separate controller provided in the display unit 351 may be deactivated when the display unit 351 is attached to the main body.

That is, according to the present invention, when the display unit 351 is detached from the main body 301, the controller 180 provided in the main body 301 or the controller separately provided in the display unit 351 can control the detached display unit 351.

A control method to be explained hereinafter may be performed in one of the controller of the main body or the controller of the display unit.

Also, in the watch type mobile terminal 300 according to the present invention, when the main body 301 and the display unit 351 are separated from each other, a camera 321 connected to the display unit 351 may also be separated. In this instance, the camera 321, similar to the display unit 351, may also be controlled by the controller 180 of the main body 301 or the controller of the display unit 351.

The watch type mobile terminal 300 may also be provided with another display unit which is not detachable from the main body 301, as well as the display unit detachable from the main body 301.

Here, the controller 180 may control both of the display unit detachable from the main body and the display unit non-detachable from the main body, respectively, in a separate manner. Also, each display unit may output related screen information (or a related screen image) or a unrelated screen information.

Hereinafter, description will be given of a control method which can be implemented in the watch type mobile terminal and related embodiments with reference to the accompanying drawings. It will be understood by those skilled in the art that the present invention can be specified into other specific forms without departing from the spirit and essential features of the present invention.

Also, the drawings will be explained, starting from a top-left drawing, in a clockwise direction or on the top-to-down basis.

FIG. 4 is a flowchart illustrating a method for controlling a watch type terminal in accordance with one exemplary embodiment disclosed herein, and FIGS. 5A and 5B are conceptual views illustrating the control method of FIG. 4.

First, a watch type mobile terminal according to one embodiment of the present invention may sense whether or not a display unit is detached from a main body (S410).

The present invention relates to a watch type mobile terminal 300. The watch type mobile terminal 300 may include a main body 301, a display unit 351 and a band 302.

The main body 301 may be configured such that the display unit 351 is detached therefrom or attached thereto. In more detail, the main body 301 may further include a coupling portion to or from which the display unit 351 is attached or detached.

The main body 301 may include the controller 180, the wireless communication unit 110, and the memory 170 illustrated in FIG. 1A.

The controller 180 may control the display unit 351 in response to the attachment and detachment of the display unit 351.

In more detail, when the display unit 351 is attached to the main body 301, the controller 180 may be directly connected to the display unit 351 to control the display unit 351. Also, when the display unit 351 is detached from the main body 301, the controller 180 may control the display unit 351 through communication. Here, the watch type mobile terminal may be separately provided with a communication unit which is connected to the detached display unit 351 to perform communication with the main body 301.

When the display unit 351 is detached from the main body 301, the controller 180 may transmit a control command to the display unit 351. For example, when the detachment of the display unit 351 from the main body 301 is sensed, the controller 180 may transmit a control command for controlling transparency of the display unit 351.

Meanwhile, the display unit 351 detachable from the main body 301 may be connected to a communication unit (not illustrated) which communicates with the main body 301 when the display unit 351 is detached from the main body 301, and a camera 321 which captures an image of an external object. Here, the communication unit and the camera 321 may be separated from the main body 301, together with the display unit 351.

The display unit 351 detachable from the main body 301 may also have transparency which is adjustable. Here, the transparency of the display unit 351 may be defined as a transmitted degree (or level) of light incident on the display unit 351. For example, the transparency of the display unit 351 may be defined as a ratio between a quantity of light incident onto the display unit 351 and a quantity of light transmitted through the display unit 351. On the other hand, the transparency of the display unit 351 may also be defined in various manners indicating a transmitted degree of light, in addition to the aforementioned method.

The controller 180 may control the transparency of the display unit 351. Here, the controller 180 may control the transparency of the display unit 351 such that the user can see an object located at the rear of the display unit 351. For example, when the display unit 351 has high transparency, the display unit 351 can transmit most of incident light thereon. Here, the user can see the object located at the rear of the display unit 351.

Also, when the display unit 351 has low transparency, the display unit 351 may not transmit most of incident light thereon. Here, the user cannot see the object located at the rear of the display unit 351.

The display unit 351 may display screen information even when detached from the main body 301. For example, while the display unit 351 is separated from the main body 301, the display unit 351 may display screen information related to a function executed by the controller 180 of the main body 301. Here, the controller 180 may transmit information, which is related to the screen information to be output on the display unit 351, to the display unit 351.

Meanwhile, the watch type mobile terminal may be present in one of a lock state of restricting a reception of a user's control command, and an unlock state of allowing for a reception of the user's control command.

When the watch type mobile terminal is in the lock state, the display unit 351 may be deactivated or partially activated. Here, the deactivation of the display unit 351 may be a state that lights (lamps) of the display unit 351 are turned off and screen information is invisible. On the other hand, the activation of the display unit 351 may be a state that the lights of the display unit 351 are turned on and screen information is visible.

In addition, the partial activation of the display unit 351 may be a state that some of the lights of the display unit 351 are turned on and thus screen information is output on a part of the display unit 351. For example, as illustrated in the first drawing of FIG. 12A, when the watch type mobile terminal is in the lock state, brief information indicating a time may be output on the display unit 351. Here, the display unit 351 may be activated partially, not entirely, to output such time information.

As the display unit 351 is partially activated, battery power consumption can be reduced and minimal information can be provided to the user in the present invention.

Meanwhile, while the watch type mobile terminal is in the lock state, the controller 180 may switch the lock state into the unlock state when the separation between the main body 301 and the display unit 351 is sensed.

For example, as illustrated in the first drawing of FIG. 12A, while the watch type mobile terminal is in the lock state, the controller 180 may sense the detachment of the display unit 351 from the main body 301.

Here, as illustrated in the second drawing of FIG. 12A, when the display unit 351 is detached, the controller 180 may switch the lock state into the unlock state and output a home screen page on the display unit 351. Here, the home screen page is screen information which is output in an idle state. For example, the home screen page may be screen information with an icon indicating an application, a widget and the like.

When the separation between the main body 301 and the display unit 351 is sensed, the controller 180 may switch the lock state into the unlock state and activate the camera 321 connected to the display unit 351. For example, as illustrated in the third drawing of FIG. 12A, the controller 180 may activate the camera 321 and output an image received from the camera 321 on the display unit 351.

Also, when the separation between the main body 301 and the display unit 351 is sensed, the controller 180 may output screen information for switching the lock state into the unlock state on the display unit 351.

In more detail, when the detachment of the display unit 351 is sensed, the controller 180 may display a lock screen for releasing the lock state on the display unit 351.

Here, the lock screen may be screen information indicating various releasing methods preset in the watch type mobile terminal, such as a screen for inputting pattern information to release the lock state, a screen for inputting a password, a screen for recognizing a face, and the like. For example, as illustrated in the fourth drawing of FIG. 12A, the controller 180 may output on the display unit 351*a* screen for receiving an input of pattern information to release the lock state.

That is, when the display unit 351 is detached while the watch type mobile terminal is in the lock state, various controls for releasing the lock state can be performed.

Meanwhile, the watch type mobile terminal disclosed herein can sense the detachment of the display unit 351 in the unlock state. Here, while the watch type mobile terminal is in the unlock state, a home screen page indicating an idle screen or an execution screen of a function currently executed on the watch type mobile terminal may be output on the display unit 351.

For example, as illustrated in the first drawing of FIG. 12B, in the unlock state of the watch type mobile terminal, a home screen page may be output on the display unit 351. Here, the controller 180 may sense the detachment of the display unit 351 in the unlock state in which the reception of the user's control command is enabled.

As illustrated in the second drawing of FIG. 12B, when the detachment of the display unit 351 is sensed, the controller 180 may output an image received from the camera 321 on the display unit 351.

Afterwards, when the detachment of the display unit from the main body is sensed in the watch type mobile terminal according to the one embodiment, the camera connected to the display unit may be activated (S420).

The watch type mobile terminal according to the one embodiment disclosed herein may further include a sensing unit that senses whether or not the display unit 351 is detached from the main body 301.

Here, when the sensing unit senses the detachment of the display unit 351 from the main body 301, the controller 180 may activate the camera 321 connected to the display unit 351. Here, the camera 321 may be connected to the detachable display unit 351 so as to be separated along with the display unit 351 when the display unit 351 is detached from the main body 301. Also, to activate the camera 321 may indicate a state in which a reception of an image of an external object is enabled through the camera 321.

When the display unit 351 and the camera 321 are detached from the main body 301, the controller 180 may transmit a control command for activating the camera 321 through the wireless communication unit 110. Here, the display unit 351 detachable from the main body 301 may further include a communication unit to perform communication with the main body 301. The communication unit of the detachable display unit 351 may be detachable from the main body 301 along with the display unit 351.

Here, the control command transmitted by the controller 180 may be received by the camera 321 through the communication unit provided in the display unit 351. Upon the reception of the control command, the camera 321 may be activated.

Meanwhile, before the display unit 351 is detached, a specific function may be executed in the watch type mobile terminal. For example, a specific application (for example, an application associated with a video reproduction) may be currently executed in the watch type mobile terminal. Here, when the detachment of the display unit 351 is sensed, the controller 180 may stop the execution of the application associated with the video reproduction, and activate the camera 321.

Also, when the detachment of the display unit 351 is sensed, the controller 180 may allow the user to select whether or not to stop the currently-executed function. For example, the controller 180 may output a graphic object on the display unit 351 for the user to select whether or not to stop the currently-executed function. Accordingly, the present invention can provide a user interface to which a user's intention is more reflected.

In addition, when it is sensed that the display unit 351 is attached to the main body 301, the controller 180 may restart the function whose execution has been stopped due to the detachment of the display unit 351. In more detail, the controller 180 may re-output an execution screen of the stopped function on the display unit 351 attached to the main body 301.

When the camera is activated, the watch type mobile terminal according to the one embodiment disclosed herein may display an image received from the camera on the display unit (S430).

In the watch type mobile terminal according to the one embodiment disclosed herein, when the display unit 351 is detached from the main body 301, the camera 321 connected to the display unit 351 may be activated.

When the camera 321 is activated, the watch type mobile terminal may receive an image of an external object through the camera 321. Here, the controller 180 may display the image received through the camera 321 on the display unit 351. That is, the user can see the image received through the camera 321 on the display unit 351 while the display unit 351 is detached from the main body 301.

Also, due to the detachment of the display unit 351, the user can more freely move the display unit 351 than when the display unit 351 is attached to the main body 301. In more detail, while wearing the main body 301 on a wrist, the user can move only the display unit 351 by separately detaching it. That is, the present invention can solve inconvenience that the display unit 351 should be moved along with the wrist because the main body 301 is worn on the wrist.

With ensuring the free movement of the display unit 351, the present invention can result in more freely setting (fixing or finding) a view point of the camera 321 attached onto the display unit 351. In more detail, the user can move the camera 321 by moving the display unit 351. This may result in changing the view point of the camera 321 more conveniently than that when the camera 321 is attached to the main body 301.

The controller 180 may transmit a capturing command for the image received from the camera 321. Here, the capturing command may be transmitted to the detached display unit 351 through communication. Upon the transmission of the capturing command, the image may be captured based on the capturing command. The controller 180 may then transmit the captured image to the main body 301.

The controller 180 may store the image transmitted to the main body 301 in the memory 170. Here, the controller 180 may output the image stored in the memory 170 on the display unit 351 after the display unit 351 is reattached to the main body 301.

The foregoing description has been given of the case where the image received from the camera 321 is output on the display unit 351.

Hereinafter, description will be given of a case where an external object is visible through the display unit 351 because the display unit 351 becomes transparent.

When the display unit 351 is detached from the main body 301, the transparency of the display unit 351 may change such that an external object located behind the display unit 351 can be viewed. In more detail, when the display unit 351 is detached from the main body 301, the controller 180 may transmit a control command to the display unit 351 such that the transparency of the display unit 351 increases. Here, the user can see the external object located behind the display unit 351 through the display unit 351.

While the external object is visible through the display unit 351, the controller 180 may transmit a control command to capture the external object viewed on the display unit 351. Here, the camera 321 connected to the display unit 351 may receive an image corresponding to the external object viewed on the display unit 351.

When the external object is visible due to the display unit 351 being transparent, the controller 180 may output information related to the external object on the display unit 351. Here, the information related to the external object may be referred to as augmented reality information. That is, the present invention can also provide the augmented reality information related to the external object when the external object is visible in response to the adjusted the transparency of the display unit 351.

Hereinafter, the detached state of the display unit 351 from the main body will be described in more detail with reference to the accompanying drawings.

As illustrated in the first drawing of FIG. 5A, the main body 301 and the display unit 351 may be detached from each other. Here, the controller 180 may sense the detachment between the main body 301 and the display unit 351. When the main body 301 and the display unit 351 are detached from each other, the controller 180 may activate the camera 321 connected to the display unit 351. Here, as illustrated in the second drawing of FIG. 5A, an image received through the camera 321 may be output on the display unit 351.

Also, when the display unit 351 is detached from the main body 301, the controller 180 may adjust the transparency of the display unit 351 such that light can be transmitted through the display unit 351. In this instance, an external object may be visible on the display unit 351. Here, the activated camera 321 may receive an image corresponding to the visible external object through the display unit 351.

When the detached display unit 351 is attached back to the main body 301, the camera 321 may be turned off. For example, as illustrated in the first drawing of FIG. 5B, while the display unit 351 is detached from the main body 301, the controller 180 may activate the camera 321 so as to receive the image of the external object.

Here, as illustrated in the second drawing of FIG. 5B, when the attachment of the display unit 351 to the main body 301 is sensed, the controller 180 may deactivate the activated camera 321. That is, the controller 180 may no longer receive the image corresponding to the external object through the camera 321.

When the main body 301 and the display unit 351 are coupled to each other, the controller 180 may adjust the transparency of the display unit 351 such that the display unit 351 becomes opaque. For example, as illustrated in the second drawing of FIG. 5B, when the main body 301 and the display unit 351 are coupled to each other, the controller 180 may output time information on the display unit 351.

Although not illustrated, when the detached display unit 351 is attached back to the main body 301, the controller 180 may store the image, which has been captured in the detached state of the display unit 351, in the memory 170 of the main body 301. That is, the present invention may allow the display unit 351 and the main body 301 to be cooperative with each other, in a manner of attaching or detaching the display unit 351, even without a separate control command.

Also, when the display unit 351 is attached, the controller 180 may allow the user to select whether or not to store the image, which has been captured in the detached state, in the memory 170. In this instance, the controller 180 may output a graphic object on the display unit 351 for a user to select storage or non-storage of the image.

When the display unit 351 is detached from the main body 301, the augmented reality information can also be output on the display unit 351.

The augmented reality information may be received from an external server provided on the display unit 351, or received from the main body 301. Here, the external server may be a pre-designated server in which the augmented reality information is stored.

In more detail, when the display unit 351 is detached from the main body 301, the transparency of the display unit 351 may be controlled. When the display unit 351 becomes transparent, the user can see the external object through the display unit 351.

Here, the controller 180 may output information related to the external object on the display unit 351. For example, as illustrated in the first and second drawings of FIG. 5C, the controller 180 may output the information related to the external object on the display unit 351.

In more detail, while the external object is viewed through the display unit 351, the controller 180 may receive identification information on the external object through the camera 321. Here, the controller 180 may receive the information related to the external object from the external server. Afterwards, the controller 180 may display the received information on a region of the display unit 351 corresponding to the location of the external object.

This may facilitate the user to obtain desired external environment information merely by moving the display unit 351.

The present invention may allow the display unit to be attached to or detached from the main body, thereby attenuating the limited movement of the watch type mobile terminal due to being worn on a wrist. The present invention may also enable the free movement of the camera provided at the watch type mobile terminal, so as to obtain a view point of the camera more easily.

The foregoing description has been given of the method for controlling the watch type mobile terminal when the display unit is detached from the main body.

Hereinafter, description will be given in more detail of a method for controlling the detached display unit when the display unit is detached from the main body. FIGS. 6A and 6B are conceptual views illustrating a method of capturing an image when the display unit is detached from the main body.

When the display unit 351 is detached from the main body 301, the controller 180 provided in the main body 301 may control the display unit 351 through communication with the separated display unit 351. For example, when the display unit 351 is detached, the controller 180 may transmit a capturing command through communication to perform capturing by use of the camera 321 connected to the display unit 351.

That is, as illustrated in the first drawing of FIG. 6A, the controller 180 may transmit a capturing command to the display unit 351 through the communication. In this instance, the camera 321 connected to the display unit 351 may capture an image in response to the capturing command.

That is, even when the display unit 351 is detached, the user can control the display unit 351 using the main body 301 worn on the wrist.

Meanwhile, the display unit 351 may be controlled on the basis of a control command received from the main body 301, but may also be controlled by its own controller connected thereto. That is, the detached display unit 351 may be separately provided with a controller which controls only the display unit 351.

In this instance, when a touch input is applied to the display unit 351, the controller separately provided in the display unit 351 may perform capturing by use of the camera 321. That is, the present invention may allow for performing the image capturing through the controller provided in the main body 301 or through the controller separately provided in the display unit 351.

When the image is captured on the display unit 351, the captured image may be transmitted to the main body 301 through communication. For example, as illustrated in the second drawing of FIG. 6A, when the image is captured on the display unit 351, the captured image may be transmitted to the main body 301. Here, the controller 180 may store the image in the memory 170.

Although not illustrated, the separately-provided controller of the display unit 351 may calculate a relative distance between the user's eyes and the detached display unit 351. For example, the controller of the display unit 351 may calculate the relative distance between the detached display unit 351 and the user's eyes through a distance sensor, such as an infrared sensor, an ultrasonic sensor and the like, disposed on the detached display unit 351.

The controller of the display unit 351 may enlarge or reduce screen information on the basis of the calculated relative distance. For example, the controller of the display unit 351 may enlarge the screen information at a first ratio when the relative distance is a first distance, and at a second ratio, which is greater than the first ratio, when the relative distance is a second distance which is longer (or farther) than the first distance.

Meanwhile, the control command may be generated in various manners. Here, the control command may be generated in various manners, such as a touch input, a voice input, a gesture input and the like applied onto the main body.

For example, the controller 180 may generate a control command on the basis of a movement of the main body 301. In more detail, the controller 180 may generate a control command by sensing a movement of a wrist with the watch type mobile terminal worn thereon.

Here, the controller 180 may generate different control commands for performing different functions, on the basis of a moving direction of the wrist. For example, when a movement of the wrist in a first direction is sensed, the controller 180 may generate a first control command. When a movement of the wrist in a second direction is sensed, the controller 180 may generate a second control command.

For example, as illustrated in the second drawing of FIG. 6B, when a rotation of the wrist in a first direction is sensed, the controller 180 may generate a control command for performing video capturing by use of the camera 321 connected to the display unit 351. The controller 180 may then transmit the control command for performing the video capturing to the display unit 351 detached from the main body 301 through communication.

Here, as illustrated in the first drawing of FIG. 6B, a currently-captured video may be output on the display unit 351. Along with this, a graphic object 600 indicating that the video is currently captured may also be output on the display unit 351. This may allow the user to recognize (or view) that the video is currently captured.

As another example, referring to the second drawing of FIG. 6B, when a rotation of the wrist in a second direction is sensed, the controller 180 may generate a control command for performing still image capturing by use of the camera 321 connected to the display unit 351. Similar to the previous example, the controller 180 may transmit the control command for performing the still image capturing through communication.

Here, as illustrated in the second drawing of FIG. 6B, an image received from the camera 321 may be output on the display unit 351, and in addition, a graphic object 610 indicating that the still image is currently captured may be output on the display unit 351.

The foregoing description has been given of the case where the camera is activated.

However, the present invention may not be limited to this. The present invention can also provide various functions executable on the mobile terminal through the display unit 351, in response to control commands received from the main body 301, after the display unit 351 is detached from the main body 301.

That is, the present invention may be configured such that a function currently executed on the main body can be displayed on the detached display unit 351. In this instance, the controller 180 may transmit various control commands related to the function through communication. Here, the currently-executed function may be a function executable on the watch type mobile terminal. For example, the currently-executed function may be a function of executing an application installed in the watch type mobile terminal.

The foregoing description has been given of the method of transmitting the control command when the main body 301 and the display unit 351 are detached from each other. This may allow the display unit to be controlled merely by manipulating the main body, without any separate manipulation for the display unit.

Also, the present invention can prevent a change in a view point of the camera by capturing an image without manipulating the display unit connected with the camera, thereby obtaining a more clear image even without moving the camera.

Hereinafter, a method of performing a different function according to a manner of detaching the display unit from the main body will be described. FIG. 7 is a conceptual view illustrating that the display unit provided at the watch type mobile terminal rotates, and FIG. 8 is a conceptual view illustrating that a different function is executed according to a rotated degree of the display unit provided at the watch type mobile terminal.

The watch type mobile terminal according to the one embodiment disclosed herein may be configured such that the display unit 351 is rotatable while being attached to the main body 301. Here, the display unit 351 may be formed in a circular shape to be rotatable.

The controller 180 may sense a degree that the display unit 351 rotates. In more detail, the controller 180 may sense a rotated angle of the display unit 351 on the basis of a case where the display unit 351 is located at a reference position with respect to the main body 301. Here, the reference position may be a factory-preset position of the watch type mobile terminal.

When the display unit 351 rotates, the controller 180 may output a graphic object indicating a rotated degree of the display unit 351 on one region of the display unit 351. For example, as illustrated in the first drawing of FIG. 7, while the display unit 351 is located at the reference position with respect to the main body 301, the controller 1809 may sense the rotation of the display unit 351.

Here, the controller 180 may output a graphic object 700 indicating the rotated degree on an edge region of the display unit 351.

When the display unit 351 rotates, the controller 180 may sense the rotation of the display unit 351. For example, as illustrated in the second drawing of FIG. 7, the controller 180 may sense the rotated angle θ1 of the display unit 351 in a clockwise direction.

Here, the controller 180 may perform a function associated with or linked to the rotated angle, on the basis of the rotated angle of the display unit 351. Also, the controller 180 may perform a different function on the basis of the rotated angle of the display unit 351.

As illustrated in the first drawing of FIG. 8A, when the display unit 351 rotates, the controller 180 may output graphic objects 800a and 800b, which indicate functions associated with each rotated angle, on regions of the display unit 351 corresponding to each rotated angle.

For example, when the rotation of the display unit 351 is sensed, the controller 180 may output the graphic object 800a indicating a camera function and the graphic object 800b indicating a timer function on the regions corresponding to each rotated angle.

Here, in a state that the display unit 351 has rotated as wide as a preset rotation angle, when the display unit 351 is detached from the main body 301, the controller 180 may execute a function associated with the rotated angle.

For example, as illustrated in the first and second drawings of FIG. 8A, when the display unit 351 is detached from the main body 301 after rotating by a first angle, the controller 180 may execute the camera function, and output an execution screen for executing the camera function.

As another example, as illustrated in the first and second drawings of FIG. 8B, when the display unit 351 is detached from the main body 301 after rotating by a second angle, the controller 180 may execute the timer function and output an execution screen for executing the timer function.

Meanwhile, the foregoing description has been given of the examples of executing the functions when the display unit 351 is detached after rotation. However, the present invention may also be configured to immediately execute a function associated with a rotated angle when the rotated angle of the display unit 341 is equal to a preset angle.

Accordingly, when the display unit and the main body are detached from each other, the present invention can provide a different function according to the rotated angle of the display unit at the moment that the display unit is detached from the main body.

Hereinafter, description will be given of a method of executing a different function according to an attached (or coupled) angle when the detached display unit is attached to the main body. FIGS. 9A to 9C are conceptual views illustrating that a different function is executed according to an attached angle when a detached display unit is attached.

The controller 180 may sense a rotated angle of the display unit 351 at the moment when the display unit 351 is detached from the main body 301. The controller 180 may also sense a rotated angle of the display unit 351 at the moment when the display unit 351 is attached to the main body 301.

Here, the controller 180 may execute a different function according to the rotated angle when the display unit 351 is attached to the main body 301. Here, the controller 180 may sense a rotated angle in a clockwise direction of the display unit 351 on the basis of the reference position of the display unit 351 with respect to the main body 301.

For example, as illustrated in the first and second drawings of FIG. 9A, the controller 180 may sense that the display unit 351 is attached to the main body 301 at a first angle. Here, the controller 180 may execute a function associated with the first angle, for example, a function of synchronizing files stored in the memory 170. Here, the function of synchronizing the files may refer to a function of storing temporarily-generated files, which have not been stored in the memory 170, in the memory 170. Also, the function of synchronizing the files may refer to a function of detecting files, which have not been stored in one of two separate devices, from the other device and then transmitting the detected files to the one device.

Meanwhile, when it is sensed that the display unit 351 is attached to the main body 301 at the first angle, the controller 180 may execute a function of synchronizing files, which have been temporarily stored on the display unit 351, with the main body 301. Here, screen information which indicates that the files are currently synchronized may be output on the display unit 351. For example, as illustrated in the third and fourth drawings of FIG. 9A, the controller 180 may synchronize the files and output the screen information indicating the currently-executed synchronization on the display unit 351.

Meanwhile, the display unit 351 may be formed in the circular shape to be rotatable with respect to the main body 301. Alternatively, the display unit 351 may also be formed in a rectangular shape so as to be unrotatable relative to the main body 301. For example, as illustrated in the first drawing of FIG. 9B, the display unit 351 may be formed in the rectangular shape so as to be unrotatable relative to the main body 301.

In this instance, the controller 180 may detect an angle at which the display unit 351 is attached to the main body 301. For example, when the display unit 351 is formed in the rectangular shape, the controller 180 may sense the attachment at one of 0°, 90°, 180° and 270°, on the basis of a preset reference position.

Here, the controller 180 may execute different functions based on the attached angles. For example, as illustrated in the first and second drawings of FIG. 9B, the controller 180 may sense that the display unit 351 is attached to the main body 301 at a first angle. Here, as illustrated in the third drawing of FIG. 9B, the controller 180 may execute a function of synchronizing files as a function associated with the first angle.

As another example, as illustrated in the first and second drawings of FIG. 9C, the controller 180 may sense that the display unit 351 is attached to the main body 301 at 90°. Here, as illustrated in the third drawing of FIG. 9C, the controller 180 may execute a function of editing an image, associated with the angle of 90°.

The foregoing description has been given of the execution of a different function according to an attached angle between the display unit and the main body. This may provide various functions to the user on the basis of the coupled (attached) angle between the display unit and the main body.

Hereinafter, description will be given of configuring a band to which components are assembled (attachable/detachable) in a watch type mobile terminal. FIG. 10 is a conceptual view illustrating a band to which components can be assembled (attached) in a watch type mobile terminal.

The band 302 of the watch type mobile terminal according to the one embodiment disclosed herein may be configured in a manner that components of the mobile terminal can be attachable and detachable to and from the band 302. In more detail, the watch type mobile terminal may be configured to have a Wi-Fi module 1040, a battery module 1010, 1030, a Bluetooth module 1020 and the like all of which are detachable therefrom. For example, as illustrated in FIG. 10, the band may have modules each detachable therefrom.

This may allow for providing a watch type mobile terminal performing personalized functions for each user. Also, the user can conveniently use a module having his or her desired function by attaching it to the band.

The foregoing description has been given of the watch type mobile terminal with the band employing the assembling manner. Hereinafter, description will be given of a method of controlling the main body while the display unit is separately charged in a detached state. FIG. 11 is a conceptual view illustrating a control method through a band in a state that a display unit is charged after being detached.

The watch type mobile terminal according to the one embodiment disclosed herein may be configured such that only the display unit 351 is detached and then charged. That is, the user may separate only the display unit 351 for charging, without taking off the band of the watch type mobile terminal.

Here, the present invention may provide brief information through a display unit which is separately provided on the band. That is, while the display unit 351 is charged, the controller 180 may output brief screen information on the display unit provided on the band 302. For example, as illustrated in the first drawing of FIG. 11, while the display unit 351 is charged in the detached state, the controller 180 may sense that the user is currently located in a cafe.

In this instance, as illustrated in the second drawing of FIG. 11, the controller 180 may output information related to the cafe (for example, discount coupon information, menu information, etc.) on the display unit provided on the band 302.

Although not illustrated, when the display unit 351 is attached back to the main body 301 after being charged in the detached state, the main body 301 may be charged through the display unit 351.

That is, the present invention may allow the user to charge the watch type mobile terminal while still wearing it on the wrist. Therefore, the user can perform charging without inconveniently taking the watch type mobile terminal off the wrist.

The foregoing description has been given of performing the charging in the watch type mobile terminal. Hereinafter, a method of performing a call function in the watch type mobile terminal will be described.

Although not illustrated, when a call signal is received in the watch type mobile terminal from an external terminal, a call function may be performed by detaching the display unit 351. In more detail, the controller 180 may sense the reception of the call signal from the external terminal while the display unit 351 is attached to the main body 301.

Here, when the detachment of the display unit 351 from the main body 301 is sensed, the controller 180 may execute the call function to perform a call with the external terminal. The detached display unit 351 may be provided with a speaker and a microphone for performing the call.

Here, the user may perform the call communication with the external terminal using the detached display unit 351. Accordingly, the limitation of the user's movement which is caused due to the watch type mobile terminal being worn on the wrist can be solved.

The present invention may provide a method of capturing an image by detaching the display unit in the watch type mobile terminal having the display unit detachable from the main body. Accordingly, the present invention can solve the inconvenience of a limited image capturing range due to the watch type mobile terminal being worn on the wrist. Also, the user can easily obtain desired external environment information merely by moving the display unit 351.

The present invention can attenuate the limited movement of the watch type mobile terminal due to being worn on the wrist, in a manner of allowing the detachment between the display unit and the main body. Also, the view point of the camera provided in the watch type mobile terminal can be easily found, which results from ensuring the free movement of the camera.

Hereinafter, description will be given of a method of controlling an external device in a manner of attaching a watch type terminal according to one embodiment disclosed herein to the external device. FIG. 13 is a flowchart of a method for controlling an external device by attaching a watch type terminal according to one embodiment disclosed herein to the external device. FIGS. 14A and 14B are conceptual views illustrating types of sensors provided in a watch type terminal in accordance with the present invention. FIG. 15 is a conceptual view illustrating types of external devices to which a watch type terminal according to the present invention is attachable. FIG. 16 is a conceptual view illustrating the control method of FIG. 13.

A watch type terminal according to one embodiment disclosed herein may sense an attachment of a main body thereof onto a first device (S1310).

The watch type terminal according to the one embodiment may include a main body 301, and a band 302 connected to the main body 301 to be worn on a wrist. Also, the watch type terminal may further include a display unit 351, a sensing unit 362, an infrared communication unit 361, a communication unit 110, and a controller 180.

The main body 301 may be detachable from or attachable to the band 302. Here, the watch type terminal may further include a connection portion for the attachment and the detachment between the main body 301 and the band 302.

The main body 301 may also be attachable to or detachable from an external device. To this end, the main body 301 may further include a coupling portion. The coupling portion may be configured as a magnetic sensor for the coupling with an external device. Or, the coupling portion may have a coupling groove for the coupling with an external device.

Meanwhile, the coupling with the external device may refer to a state that communication is currently executed through the communication unit without a physical contact with the external device. In more detail, the coupling with the external device may include a state that communication is executable through a near field communication unit at a position adjacent to the external device.

The display unit 351 may output screen information including a graphic object. The screen information may be screen information related to an operation of the watch type terminal, screen information related to a currently-executed function on the watch type terminal, or the like. The screen information related to the operation of the watch type terminal may be screen information which indicates a lock state of restricting a reception of a user control command, an unlock state of allowing for the reception of the user control command, an idle state of waiting for receiving the user control command, and the like. Also, the screen information related to the currently-executed function on the watch type terminal may be an execution screen of an application (or program) installed in the watch type terminal.

The sensing unit 362 may sense a state of the watch type terminal and an external environment. The state of the watch type terminal may correspond to whether or not the main body 301 and the band 302 are currently separated from or coupled to each other. Also, the external environment may correspond to an object adjacent to the watch type terminal, a heart rate of a wrist with the watch type terminal worn thereon. For example, the sensing unit 362 may be a magnetic sensor 362*a*, 362*b* and a touch sensor 362*c*.

The infrared communication unit 361 may generate an infrared signal and transmit the generated infrared signal to an external device.

The communication unit 110, as previously illustrated in FIG. 1, may perform communication through various near field and remote communication technologies.

The controller 180 may control the display unit 351, the sensing unit 362, the communication unit 110 and the infrared communication unit 361. That is, the controller 180 may perform overall controls associated with functions executable on the watch type terminal.

For example, the controller 180 may sense through the sensing unit 362 that the main body 301 is attached to the first device.

In more detail, the controller 180 may sense whether or not the main body 301 is in the detached state from the band 302. Here, when the main body 301 is detached from the band 302, the controller 180 may switch a state of the watch type terminal into a state of allowing a control with respect to the external device. More specifically, the controller 180 may switch a general mode for performing general functions into an external control mode for controlling the external device.

Here, the state of allowing the control with respect to the external device may be the external control mode. The external control mode may be a mode of generating an infrared signal for controlling the external device.

Also, when it is sensed that the main body 301 is attached to the band 302, the controller 180 may terminate the external control mode. In this instance, the controller 180 may switch the state of the watch type terminal from the external control mode into the previous general mode.

Hereinafter, description will be given of an example that the state of allowing the control with respect to the external device is the external control mode, but the term will be changeable into different terms by those skilled in the art.

The first device may be a device which is allowed to perform infrared communication. That is, the first device may be a device which performs a control through infrared communication.

For example, as illustrated in FIG. 15, the first device may be any type of electronic devices, such as a TV, an audio, an air conditioner, a room cleaner, a running machine, a motorbike, a refrigerator and the like, which support the reception of the infrared signal.

When the attachment to the first device is sensed, the controller 180 may determine a type of the first device. For example, when the attachment to the first device is sensed, the controller 180 may sense information related to the type of the first device through the sensing unit 362.

In this instance, the controller 180 may transmit the information related to the type of the first device to a second device. That is, the controller 180 may transmit the information related to the type of the first device to the second device, such that the second device can recognize the type of the first device. Also, the second device which has received the information related to the type of the first device may generate an appropriate control command associated with the first device.

When the attachment to the first device is sensed, the watch type terminal according to the one embodiment may receive a control signal associated with the first device from a second device, which is different from the first device (S1320).

The controller 180 may sense through the sensing unit 362 that the main body 301 is attached to the first device.

The controller 180 may receive the control signal associated with the first device from the second device, different from the first device, through the communication unit 110, after sensing the attachment to the first device. The second device may be a device which has a communication unit to enable wireless communication with the watch type terminal. For example, the second device may be an electronic device having a communication unit, such as a mobile terminal, a computer, a tablet, and the like.

The second device may receive a control command for controlling the first device from the user. Here, the second device may generate the control command for the control of the first device, in response to a user input. When the control command for the control of the first device is generated, the second device may transmit the control command for controlling the first device to the watch type terminal through the communication unit.

When the control signal associated with the first device is received, the watch type terminal according to the present invention may generate an infrared signal for controlling the first device on the basis of the control signal associated with the first device (S1330).

The controller 180 may control the infrared communication unit 362 to generate the infrared signal for controlling the first device on the basis of the control signal associated with the first device.

That is, the first device and the second device may not be allowed for direct communication with each other. In this instance, the watch type terminal according to the present invention may play a role of a relay between the first device and the second device.

When the infrared signal is generated, the watch type terminal disclosed herein may transmit the infrared signal to the first device through the infrared communication unit (S1340).

When the infrared signal is generated, the controller 180 may transmit the infrared signal to the first device through the infrared communication unit 362.

The first device may receive the infrared signal and perform a function according to the infrared signal. For example, the first device may be controlled to be turned off in response to the infrared signal.

For example, as illustrated in FIG. 16, the watch type terminal 300 may be attached to a TV which cannot perform communication because of absence of a communication unit. In this instance, when it is sensed that the watch type terminal is attached to the TV, the controller 180 may receive a control signal associated with the TV from a mobile terminal 100.

More concretely, a controller of the mobile terminal 100 may output screen information on a display unit 151 provided on the mobile terminal 100 to request for a generation of a control command associated with the first device. For example, the screen information requesting for the generation of the control command associated with the first device may be screen information requesting for a generation of a control command to turn the TV off.

When the control command for the first device is generated, the controller of the mobile terminal 100 may transmit the control command for the first device to the watch type terminal 300. For example, the controller of the mobile terminal 100 may transmit the control command for turning the TV off to the watch type terminal 300 through the communication unit.

Upon the reception of the control command for the first device, the controller 180 of the watch type terminal may control the infrared communication unit 362 to generate the infrared signal on the basis of the control command associated with the first device. The infrared communication unit 362 may generate the infrared signal on the basis of the control command for the first device.

Upon the generation of the infrared signal, the controller 180 of the watch type terminal 300 may transmit the infrared signal to the first device through the infrared communication unit 362.

Upon the reception of the infrared signal, the first device may be controlled according to the infrared signal. For example, the first device may be controlled to be turned off in response to the reception of the infrared signal.

In such a manner, the present invention can even remotely control an external device without a communication means through the watch type terminal having the communication unit. Also, the watch type terminal disclosed herein can be easily attached to or detached from an external device by virtue of the detachable structure between the main body and the band thereof.

Hereinafter, description will be given of a method for controlling the watch type terminal in an attached state when the watch type terminal is attached to a first device. FIGS. 17A 17B and 18 are conceptual views illustrating a method for controlling the watch type terminal in an attached state when the watch type terminal is attached onto a first device.

The watch type terminal 300 disclosed herein may be configured such that the main body 301 is detached from the band 302 and thereafter attached (or coupled) to an external device. Here, when the main body 301 is attached to the external device, the controller 180 may detect the attached state to the external device. Here, the attached state refers to a characteristic that the main body 301 is attached to the external device, for example, an attached position of the main body 301 on the external device, an attached posture of the main body 301, and the like.

The controller 180 may receive different information from the external device on the basis of the attached state to the external device. In more detail, when the main body 301 is attached to a first position of the external device, the controller 180 may receive first information associated with the first position. When the main body 301 is attached to a second position of the external device, the controller 180 may receive second information associated with the second position.

For example, as illustrated in FIG. 17A, the controller 180 may sense that the main body 301 of the watch type terminal 300 is attached to one region of a front surface 1751 of a refrigerator. Here, the front surface 1751 of the refrigerator may be configured as a display unit for outputting screen information, or a general case. Also, the front surface 1751 of the refrigerator may further be provided with a coupling portion to which the watch type terminal 300 is attached. For example, the front surface 1751 of the refrigerator may have a magnetic flux to be coupled with the main body 301.

When the attachment of the main body 301 is sensed, the controller 180 may determine a region where the main body 301 is currently attached of an entire output region of the front surface 1751 of the refrigerator. For example, as illustrated in FIG. 17A, the main body 301 may be attached to an upper end portion of the front surface 1751 of the refrigerator.

Here, when the attachment to the upper end portion of the front surface 1751 is sensed, the controller 180 may control the communication unit 110 to request for status information associated with the upper end portion of the front surface 1751 from the refrigerator. The refrigerator may be a refrigerator having a communication unit which enables communication with the watch type terminal 300.

The refrigerator may then provide the status information associated with the upper end portion of the front surface 1751 to the watch type terminal 300 through the communication unit, in response to the status information request.

Upon the reception of the status information, the controller 180 may output the status information on the display unit 351. For example, as illustrated in FIG. 17A, the controller 180 may output on the display unit 351 the status information associated with the upper end portion of the front surface 1751, namely, "there are three eggs left in the first shelf of the refrigerating chamber."

As illustrated in FIG. 17B, when it is sensed that the main body 301 is attached to a lower end portion of the front surface 1751 of the refrigerator, the controller 180 may control the communication unit 110 to request for status information associated with the lower end portion of the front surface 1751 from the refrigerator.

The refrigerator may then provide the status information associated with the lower end portion of the front surface 1751 to the watch type terminal 300 through the communication unit, in response to the status information request.

Upon the reception of the status information associated with the lower end portion of the front surface 1751, the controller 180 may output the status information on the display unit 351. For example, as illustrated in FIG. 17B, the controller 180 may output on the display unit 351 the status information associated with the lower end portion of the front surface 1751, namely, "there are six tangerines left in the third shelf of the refrigerating chamber."

That is, the watch type terminal disclosed herein may receive different information according to a position where the main body 301 is attached to an external device and provide the different information to the user. Also, the watch type terminal disclosed herein may receive status information from an external device without a display unit and provide it to the user.

Meanwhile, while the main body 301 is detached from the band 302, the controller 180 may sense an external device which can perform communication therewith at an adjacent region to the main body 301. In this instance, the controller 180 may perform short-range communication (for example, Bluetooth communication) with the external device.

While the short range communication is performed, the controller 180 may sense a relative position of the external device and the main body 301. For example, as illustrated in FIG. 18, the controller 180 may sense a relative position of a tablet having a display unit 1851 and the main body 301. The relative position may refer to a portion, obscured by the main body 301, of a front region of the display unit 1851 of the tablet.

The controller 180 may receive information related to the relative position from the external device through the communication unit, on the basis of the relative position. The information related to the relative position may be information, which is output on the display unit 1851 of the tablet corresponding to the relative position, or information related to the information output on the display unit 1851 of the tablet corresponding to the relative position. For example, when the information output on the region corresponding to the relative position is map information, the information associated with the relative position may be restaurant information related to the map information, or information which is displayed in response to an enlargement of the map information.

Explaining it in more detail with reference to the drawing, as illustrated in FIG. 18, while the map information is output on the display unit 1851 of the tablet, the controller 180 may detect the main body 301 and one region of the display unit 1851 of the tablet as the relative position. Here, the controller 180 may request for information related to the relative position from the tablet.

The tablet may transmit the information associated with the relative position of the map information output on the display unit 1851 to the watch type terminal 300, in response to the request. For example, the information associated with the relative position may be restaurant information located at a position on the map output on the display unit 1851 of the tablet.

Here, the controller 180 may output the information associated with the relative position on the display unit 351.

For example, as illustrated in FIG. 18, information related to "R-restaurant at Gangnam station" may be output on the display unit 351.

In such a manner, the user can obtain information output on a display unit of an external device, like as viewing the information through a magnifying glass, through the display unit of the watch type terminal.

Hereinafter, description will be given of a method of performing a control according to status information on the watch type terminal while the watch type terminal is attached to an external device. FIG. 19 is a conceptual view illustrating a method of performing a control according to status information related to the watch type terminal when the watch type terminal is attached onto an external device.

The main body 301 of the watch type terminal 300 disclosed herein may be attachable to or detachable from an external device.

Here, the controller 180 may detect status information when it is sensed that the main body 301 is attached to the external device. The status information may be current time information, current date information, information on a function currently executed on the watch type terminal 300, information on a user's heath state and the like. The information on the user's health state may be information which is sensed while the watch type terminal is worn on the user's wrist.

The external device may include a display unit 1951 which outputs the status information on the watch type terminal. For example, the external device may be an electronic device having a mirror-type display unit 1951. The mirror-type display unit 1951 may output screen information on one region of the mirror while showing an external object, like as a mirror.

When the attachment to the external device is sensed, the controller 180 may control the external device to output the status information. For example, as illustrated in FIG. 19, when the main body 301 is attached to the mirror-type display unit 1951 while a video is output on the watch type terminal, the controller 180 may output the video on the mirror-type display unit 11951.

As another example, when the main body 301 is attached to the mirror-type display unit 1951, the controller 180 may display weather information, user's health information, schedule information and the like on the mirror-type display unit 1951. The controller 180 may also display on the mirror-type display unit 1951 additional information related to the status information, such as a location of a hospital and a dose of medicine both related to the user's health information, recommended dress information based on the weather information, and the like.

In such a manner, the user can execute various functions through a display unit provided on an external terminal, even when the user does not wear the watch type terminal.

Hereinafter, description will be given of a method of providing information related to an external device through the watch type terminal on the basis of a type of the external device to which the watch type terminal is attached. FIGS. 20A and 20B are conceptual views illustrating a method of providing different information according to a type of an external device to which the watch type terminal is attached.

The watch type terminal disclosed herein may determine a type of an external device when being attached to the external device. In more detail, when the attachment to the external device is sensed, the controller 180 may receive information indicating the type of the external device from the external device.

Here, the controller 180 may determine the type of the external device, to which the main body 301 is attached, on the basis of the information indicating the type. Also, the controller 180 may detect the information related to the type of the external device, on the basis of the information indicating the type of the external device. The information related to the type of the external device may be information pre-stored in the watch type terminal, information sensed by the sensing unit of the watch type terminal and the like. For example, when the type of the external device is a running machine, the information related to the type of the external device may be information related to a body of the user of the watch type terminal, for example, the number of walking steps and the like.

The controller 180 may process the information related to the type of the external device, in association with the type of the external device. Also, the controller 180 may output processed information on the display unit 351.

For example, as illustrated in FIG. 20A, when the external device is a running machine, the controller 180 may recommend an exercise time using the running machine to the user on the basis of the number of walking steps. That is, the controller 180 may provide useful information to the user by linking the body information sensed in the watch type terminal to the external device.

As another example, the controller 180 may sense that the external device is a tumbler. Also, the controller 180 may sense information related to the external device, such as drink currently contained in the tumbler, and an amount of the drink. In this instance, the controller 180 may process the information related to the sensed external device by linking it to the type of the external device. That is, as illustrated in FIG. 20B, the controller 180 may provide through the display unit 351 information indicating "the optimal temperature for Earl grey is 50° C. Please add 300 mL of hot water more."

In such a manner, the present invention can provide useful information to the user by linking a type of an external device to pre-stored information in the watch type terminal.

Hereinafter, description will be given of a method of performing a different function according to a type of an external device to which the main body of the watch type terminal is attached. FIGS. 21A to 21D are conceptual views illustrating a method of performing a different function according to a type of an external device to which a main body of the watch type terminal is attached.

The controller 180 may switch the state of the watch type terminal into an external control mode when it is sensed that the main body 301 is detached from the band 302.

When the main body 301 is attached to an external device, the controller 180 may receive from the external device information relating to a type of the external device. Or, the controller 180 may control the sensing unit to sense the type of the external device to which the main body 301 has been attached.

When the type of the external device is determined, the controller 180 may execute a function associated with the type of the external device.

The function associated with the type of the external device may be a function preinstalled in the watch type terminal. On the other hand, when the function associated with the type of the external device has not been preinstalled, the controller 180 may provide a server from which the function associated with the type of the external device can be downloaded. The server for downloading the function linked to the type of the external device may be an Android market or a website. In this instance, the user may access the server and download the function associated with the type of the external device.

Also, the function associated with the type of the external device may be a function for controlling the external device. That is, the controller 180 may control the external device by executing the function associated with the type of the external device.

For example, as illustrated in FIG. 21A, when the external device is determined as a vehicle seat, a function associated with the vehicle seat may be executed. Here, the function associated with the vehicle seat may be a function of adjusting a posture (angle) of the vehicle seat.

The controller 180 may also output an execution screen of the function associated with the vehicle seat on the display unit 351. Afterwards, the controller 180 may adjust the posture of the vehicle seat, in response to a user input applied onto the display unit 351. In this manner, the present invention can conveniently control the posture of the vehicle seat using the watch type terminal, even without installing a posture control function of the vehicle seat. As another example, referring to FIG. 21B, when the external device is determined as a room mirror of a vehicle, the controller 180 may execute a function associated with the room mirror of the vehicle. Here, the function associated with the room mirror of the vehicle may be a camera function.

The controller 180 may also output an image received through the camera on the display unit 351. Here, the image received through the camera may be an image in which a back seat is captured. Accordingly, the present invention can provide even an image of a blind spot, which is invisible through the room mirror, by use of the camera.

As another example, as illustrate in FIG. 21C, when the external device is a baby's crib, the controller 180 may activate a function of the camera 321. The controller 180 may also transfer an image received from the camera 321 to a pre-designated external device, other than the crib. For example, the pre-designated device may be a mobile terminal. Also, the watch type terminal may further include a microphone for receiving voice. Here, the controller 180 may transmit the voice received through the microphone to the pre-designated external device. Accordingly, the user can receive various information relating to a situation of the external device using the watch type terminal, even without installing a separate camera at the crib.

As another example, referring to FIG. 21D, when the external device is sensed as a motorbike, the controller 180 may execute a function associated with the motorbike. The function associated with the motorbike may be a speed-measuring function.

Although not illustrated, when the external device is sensed as a crash helmet for a motorbike, the controller 180 may execute a function associated with the crash helmet. The function associated with the crash helmet may be a function which cooperates with a mobile terminal located close to the watch type terminal. More concretely, the function associated with the crash helmet may be a function of receiving in the watch type terminal a call signal, a message and the like, which have been received in the mobile terminal during movement of the motorcycle. In this manner, when the user is unable to view the mobile terminal, for example, while the user drives a motorbike, the watch type terminal can be attached onto an object (for example, the crash helmet) adjacent to the user's body and receive a call signal and a message of the mobile terminal.

Also, the watch type terminal disclosed herein may have the main body detachable from the band and thus the main body can be used for control of an external device. The watch type terminal disclosed herein may also provide a method of manipulating an external device which does not have a communication unit, even without a separation installation.

The present invention can provide various functions associated with an external device by attaching the main body to the external device. Accordingly, the present invention may easily provide various functions through the functions of the watch type terminal, without a separate installation in the external device.

Further, the present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A watch type terminal comprising:
a camera;
a display unit connected to the camera;
a main body to which the display unit is attachable; and
a controller configured to activate the camera based on whether or not the display unit is attached to the main body,
wherein the controller outputs an image received from the camera on the display unit.

2. The watch type terminal of claim 1, wherein the controller activates the camera when the display unit is detached from the main body.

3. The watch type terminal of claim 2, wherein the controller senses a rotated angle of the display unit with respect to the main body in a clockwise or counterclockwise direction, and wherein when the display unit is detached from the main body in a state where the display unit is rotated, the controller activates the camera to capture one of a video and a still image on the basis of the rotated angle.

4. The watch type terminal of claim 1, further comprising:
a first communication unit connected to the display unit; and
a second communication unit connected to the main body and configured to perform communication with the first communication unit,
wherein the controller transmits a capturing command to the camera through the first and second communication units when the display unit is detached from the main body, and
wherein the controller, when an image is captured by the camera, transmits the captured image to the main body.

5. The watch type terminal of claim 1, further comprising a sensing unit configured to sense a movement of the main body, wherein the controller generates a different control command according to the movement of the main body.

6. The watch type terminal of claim 1, wherein the main body comprises a front surface,
wherein the watch type terminal further comprises another display unit disposed on the front surface of the main body,
wherein the controller outputs a second screen associated with a first screen on the another display unit of the main body when the first screen is output on the display unit while the display unit is detached from the main body.

7. The watch type terminal of claim 1, further comprising a wireless communication unit configured to receive a call signal from an external terminal,
wherein the controller executes a call function for performing a call with the external terminal when the display unit is detached while the call signal is received from the external terminal.

8. The watch type terminal of claim 1, further comprising a distance sensing unit connected to the display unit and configured to sense a relative distance between the display unit and user's eyes,
wherein the controller enlarges or reduces screen information output on the display unit on the basis of the relative distance.

9. The watch type terminal of claim 1, wherein the controller deactivates the activated camera when it is sensed that the display unit is attached to the main body.

10. A watch type terminal comprising:
a main body;
an infrared communication unit configured to generate an infrared signal;
a communication unit configured to perform communication in a wireless manner;
a sensing unit configured to sense an attachment of the main body to a first device, the first device configured to receive the infrared signal; and
a controller configured to:
control the infrared communication unit to generate an infrared signal for the first device on the basis of a control signal associated with the first device, received from a second device through the communication unit, when the attachment of the main body to the first device is sensed; and
transmit the generated infrared signal to the first device through the infrared communication unit.

11. The watch type terminal of claim 10, wherein the controller detects a type of the first device through the sensing unit, and transmits information indicating the type of the first device to the second device.

12. The watch type terminal of claim 11, wherein the controller receives a control signal from the second device, the control signal generated based on the information indicating the type of the first device, and wherein the controller generates an infrared signal for turning on or off the first device on the basis of the control signal.

13. The watch type terminal of claim 10, further comprising a band configured to be detachable from the main body and be worn on a wrist,
wherein the controller enters an external control mode for performing a function of controlling an external device when the detachment of the main body from the band is sensed, and
wherein the external control mode is a mode for transmitting the infrared signal to the first device on the basis of the control signal received from the second device.

14. The watch type terminal of claim 13, wherein the controller terminates the external control mode when the attachment of the main body to the band is sensed.

15. The watch type terminal of claim 10, wherein the controller receives status information on the first device from the first device when the first device is able to perform wireless communication with the watch type terminal.

16. The watch type terminal of claim 15, wherein the sensing unit senses a region where the main body is attached to the first device, and
wherein the controller receives status information associated with the attached region, on the basis of the attached region of the first device.

17. The watch type terminal of claim 16, further comprising a display unit configured to output screen information,
wherein the status information associated with the attached region is output on the display unit.

18. The watch type terminal of claim 10, wherein the first device is a device allowed to perform wireless communication, and
wherein the controller transmits a control command to the first device such that screen information indicating a function currently executed in the watch type terminal is output on the first device.

19. The watch type terminal of claim 10, further comprising:
a status sensing unit configured to sense status information related to the watch type terminal; and
a display unit connected to the main body,
wherein the controller detects a type of the first device when the main body is attached to the first device, and
wherein the controller outputs information indicating the type of the first device, on the display unit, the information being included in the status information related to the watch type terminal.

20. The watch type terminal of claim 10, wherein the controller controls the information indicating the type of the first device to disappear from the display unit when the main body is detached from the first device.

* * * * *